(12) United States Patent
Bai

(10) Patent No.: US 10,727,584 B2
(45) Date of Patent: *Jul. 28, 2020

(54) MULTIWAY SWITCH FOR TRANSMITTING SOUNDING REFERENCE SIGNAL SUCCESSIVELY THROUGH A SET OF ANTENNAS

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 71 days.

This patent is subject to a terminal disclaimer.

(21) Appl. No.: 16/173,518

(22) Filed: Oct. 29, 2018

(65) Prior Publication Data

US 2019/0288389 A1 Sep. 19, 2019

(30) Foreign Application Priority Data

Mar. 16, 2018 (CN) .......................... 2018 1 0220598

(51) Int. Cl.
*H01Q 3/24* (2006.01)
*H01Q 5/28* (2015.01)
(Continued)

(52) U.S. Cl.
CPC .............. *H01Q 3/247* (2013.01); *H01Q 1/243* (2013.01); *H01Q 1/50* (2013.01); *H01Q 5/28* (2015.01);
(Continued)

(58) Field of Classification Search
CPC .......... H01Q 1/243; H01Q 1/50; H01Q 3/247; H01Q 5/28; H01Q 5/392; H04B 1/44; H04B 7/0413; H04L 25/0226; H04Q 3/0004

See application file for complete search history.

(56) References Cited

U.S. PATENT DOCUMENTS 5,175,878 A 12/1992 Davis et al.
8,824,584 B2 9/2014 Kim et al.
(Continued)

FOREIGN PATENT DOCUMENTS

CN 101321012 A 12/2008
CN 101803229 A 8/2010
(Continued)

OTHER PUBLICATIONS

International search report issued in corresponding international application No. PCT/CN2018/104977 dated Dec. 20, 2018.
(Continued)

*Primary Examiner* — Devan A Sandiford

(57) ABSTRACT

A multiway switch, a radio frequency system, and a wireless communication device are provided. The multiway switch includes n T ports and four P ports. At least one of the n T ports is coupled with all of the four P ports, where n is an integer and 4≤n. The multiway switch is configured to be coupled with a radio frequency circuit and an antenna system of an electronic device to implement a preset function of the electronic device. The antenna system includes four antennas corresponding to the four P ports. The preset function is a function of transmitting a sounding reference signal (SRS) through the four antennas in turn.

17 Claims, 27 Drawing Sheets

(51) Int. Cl.
  *H01Q 5/392*  (2015.01)
  *H01Q 1/24*  (2006.01)
  *H01Q 1/50*  (2006.01)
  *H04L 25/02*  (2006.01)
  *H04B 1/44*  (2006.01)
  *H04Q 3/00*  (2006.01)
  *H04B 7/0413*  (2017.01)

(52) U.S. Cl.
  CPC .............. *H01Q 5/392* (2015.01); *H04B 1/44* (2013.01); *H04L 25/0226* (2013.01); *H04Q 3/0004* (2013.01); *H04B 7/0413* (2013.01)

(56) References Cited

U.S. PATENT DOCUMENTS

| | | | |
|---|---|---|---|
| 9,385,795 | B1 | 7/2016 | Ananthanarayanan et al. |
| 9,584,211 | B2 | 2/2017 | Kang et al. |
| 9,960,791 | B2 | 5/2018 | Desclos et al. |
| 10,075,199 | B2 | 9/2018 | King et al. |
| 10,355,738 | B1* | 7/2019 | Bai .................... H04B 1/44 |
| 10,389,401 | B1* | 8/2019 | Bai .................... H03K 17/6871 |
| 10,419,040 | B1* | 9/2019 | Bai .................... H04B 1/44 |
| 10,554,244 | B2 | 2/2020 | Bai |
| 2004/0214528 | A1 | 10/2004 | Khorram et al. |
| 2005/0036505 | A1 | 2/2005 | Frei et al. |
| 2009/0054093 | A1* | 2/2009 | Kim .................... H04B 7/061 455/500 |
| 2009/0153222 | A1 | 6/2009 | Gu |
| 2011/0249760 | A1 | 10/2011 | Chrisikos et al. |
| 2011/0250926 | A1 | 10/2011 | Wietfeldt et al. |
| 2013/0308554 | A1* | 11/2013 | Ngai .................... H04B 1/44 370/329 |
| 2013/0309982 | A1 | 11/2013 | Yan et al. |
| 2014/0140224 | A1 | 5/2014 | Håkansson |
| 2014/0211673 | A1 | 7/2014 | Park et al. |
| 2014/0227982 | A1* | 8/2014 | Granger-Jones ..... H04B 7/0404 455/77 |
| 2014/0235260 | A1 | 8/2014 | Zawaideh et al. |
| 2014/0293841 | A1* | 10/2014 | Rousu .................... H04B 1/006 370/278 |
| 2014/0334362 | A1 | 11/2014 | Granger-Jones |
| 2015/0171914 | A1 | 6/2015 | Desclos et al. |
| 2015/0215011 | A1 | 7/2015 | Hartenstein |
| 2015/0295594 | A1 | 10/2015 | Kehrer |
| 2015/0340769 | A1 | 11/2015 | Desclos et al. |
| 2016/0006409 | A1 | 1/2016 | Keane |
| 2016/0337178 | A1 | 11/2016 | Frenne et al. |
| 2017/0012358 | A1 | 1/2017 | Feng et al. |
| 2017/0155444 | A1 | 6/2017 | Patel et al. |
| 2017/0164226 | A1 | 6/2017 | Wei |
| 2017/0195004 | A1* | 7/2017 | Cheng et al. ......... H04B 7/0602 |
| 2017/0202014 | A1 | 7/2017 | Moon et al. |
| 2018/0026379 | A1 | 1/2018 | Barker et al. |
| 2018/0367199 | A1 | 12/2018 | Zimmerman |
| 2019/0097715 | A1* | 3/2019 | Maldonado ............... H03F 3/24 |
| 2019/0288714 | A1* | 9/2019 | Bai .................... H04B 1/40 |
| 2019/0288716 | A1* | 9/2019 | Bai .................... H01Q 5/45 |
| 2019/0288719 | A1* | 9/2019 | Bai .................... H04B 1/44 |
| 2019/0288720 | A1* | 9/2019 | Bai .................... H04B 1/0067 |
| 2019/0288735 | A1* | 9/2019 | Bai .................... H04B 1/40 |

FOREIGN PATENT DOCUMENTS

| | | |
|---|---|---|
| CN | 101814924 A | 8/2010 |
| CN | 101867402 A | 10/2010 |
| CN | 101895305 A | 11/2010 |
| CN | 102111176 A | 6/2011 |
| CN | 202103661 U | 1/2012 |
| CN | 102544753 A | 7/2012 |
| CN | 102595514 A | 7/2012 |
| CN | 103905104 A | 7/2014 |
| CN | 105245295 A | 1/2016 |
| CN | 105703053 A | 6/2016 |
| CN | 105870588 A | 8/2016 |
| CN | 106533526 A | 3/2017 |
| CN | 106559277 A | 4/2017 |
| CN | 106685621 A | 5/2017 |
| CN | 106712795 A | 5/2017 |
| CN | 107070485 A | 8/2017 |
| CN | 107171672 A | 9/2017 |
| CN | 108199730 A | 6/2018 |
| CN | 108462506 A | 8/2018 |
| CN | 108462507 A | 8/2018 |
| CN | 108512556 A | 9/2018 |
| CN | 108512567 A | 9/2018 |
| EP | 2485555 A1 | 8/2012 |
| WO | 2012026601 A | 3/2012 |
| WO | 2012109988 A1 | 8/2012 |
| WO | 2014154062 A1 | 10/2014 |

OTHER PUBLICATIONS

Extended European search report issued in corresponding European application No. 18202796.1 dated May 28, 2019.
Gao Xiang et al: "Multi-Switch for Antenna Selection in Massive MIMO", 2015 IEEE Global Communications Conference (GLOBECOM), IEEE, Dec. 6, 2015 (Dec. 6, 2015), pp. 1-6, XP032872922, DOI: 10.1109/GLOCOM.2014.7417765 [retrieved on Feb. 23, 2016]; sections I, III.B, III.C; figures 1, 2, 6.
Lemieux G et al: "Generating Highly-Routable Sparse Crossbars for PLDS" FPGA'00. ACM/SIGDA International Symposium on Field Programmable Gate Arrays. Monterey, CA, Feb. 9-11, 2020; [ACM/SIGDA International Symposium on Field Programmable Gate Arrays], New York, NY: ACM, US, vol. CONF. 8, Jan. 1, 2000 (Jan. 1, 2000), pp. 155-164, XP008060160, DOI: 10.1145/329166. 329199; ISBN: 978-1-58113-193-2; section 2; figure 1.
Office Action 1 issued in corresponding CN application No. 201810220942.9 dated Apr. 12, 2019.
International search report issued in corresponding international application No. PCT/CN2018/114612 dated Jan. 30, 2019.
International search report issued in corresponding international application No. PCT/CN2018/111029 dated Jan. 18, 2019.
International search report issued in corresponding international application No. PCT/CN2013/111027 dated Jan. 17, 2019.
International search report issued in corresponding international application No. PCT/CN2018/114406 dated Jan. 30, 2019.
Office Action 1 issued in corresponding CN application No. 201810220929.3 dated Apr. 1, 2019.
Extended European search report issued in corresponding European application No. 18202827.4 dated May 28, 2019.
Extended European search report issued in corresponding European application No. 18202826.6 dated May 29, 2019.
Extended European search report issued in corresponding European application No. 18203600.4 dated May 28, 2019.
Extended European search report issued in corresponding European application No. 18205931.1 dated May 28, 2019.
Office Action 1 issued in corresponding CN application No. 201810220713.7 dated Apr. 12, 2019.
Office Action 1 issued in corresponding CN application No. 201810220944.8 dated Apr. 2, 2019.

* cited by examiner

MULTIWAY SWITCH FOR TRANSMITTING SOUNDING REFERENCE SIGNAL SUCCESSIVELY THROUGH A SET OF ANTENNAS

CROSS-REFERENCE TO RELATED APPLICATION(S)

This application claims priority to Chinese Patent Application No. 201810220598.3, filed on Mar. 16, 2018, the entire disclosure of which is hereby incorporated by reference.

TECHNICAL FIELD

This disclosure relates to the field of mobile terminal technology, and particularly to a multiway switch, a radio frequency system, and a wireless communication device.

BACKGROUND

With the widespread use of electronic devices such as smart phones, the smart phone can support an increasing number of applications and is becoming more and more powerful. The smart phone is developing in a diversified and personalized way, becoming indispensable electronic products in users' life. In the fourth generation (4G) mobile communication system, the electronic device generally adopts a single-antenna or dual-antenna radio frequency (RF) system architecture. Currently, in a new radio (NR) system of the fifth generation (5G) mobile communication system, an electronic device supporting a four-antenna RF system architecture is proposed.

SUMMARY

Implementations of the disclosure provide a multiway switch, a radio frequency system, and a wireless communication device, to implement a function of transmitting a sounding reference signal (SRS) through four antennas corresponding to four ports in turn (that is, four-port SRS) of an electronic device in the fifth generation new radio (5G NR).

According to a first aspect of implementations of the disclosure, a multiway switch is provided. The multiway switch includes n T ports and four P ports. At least one of the n T ports is coupled with all of the four P ports, where n is an integer and 4≤n.

The multiway switch is configured to be coupled with a radio frequency circuit and an antenna system of an electronic device to implement a preset function of the electronic device. The antenna system includes four antennas corresponding to the four P ports. The preset function is a function of transmitting an SRS through the four antennas in turn.

According to a second aspect of implementations of the disclosure, a radio frequency system is provided. The radio frequency system includes an antenna system, a radio frequency circuit, and a multiway switch coupled with the radio frequency circuit and the antenna system.

The multiway switch includes n T ports and four P ports, at least one of the n T ports is coupled with all of the four P ports, and n is an integer and 4≤n. The antenna system includes four antennas corresponding to the four P ports. The multiway switch is configured implement a preset function of transmitting an SRS through the four antennas in turn.

According to a third aspect of implementations of the disclosure, a wireless communication device is provided.

The wireless communication device includes an antenna system, a radio frequency transceiver, a radio frequency circuit coupled with the radio frequency transceiver, and a multiway switch coupled with the radio frequency circuit and the antenna system.

The multiway switch includes n T ports and four P ports, at least one of the n T ports is coupled with all of the four P ports, and n is an integer and 4≤n. The antenna system includes four antennas corresponding to the four P ports. The multiway switch is configured to support a function of transmitting an SRS through the four antennas in turn.

BRIEF DESCRIPTION OF THE DRAWINGS

To describe technical solutions in implementations of the present disclosure or in the related art more clearly, the following briefly introduces the accompanying drawings required for describing the implementations or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Figure 1:
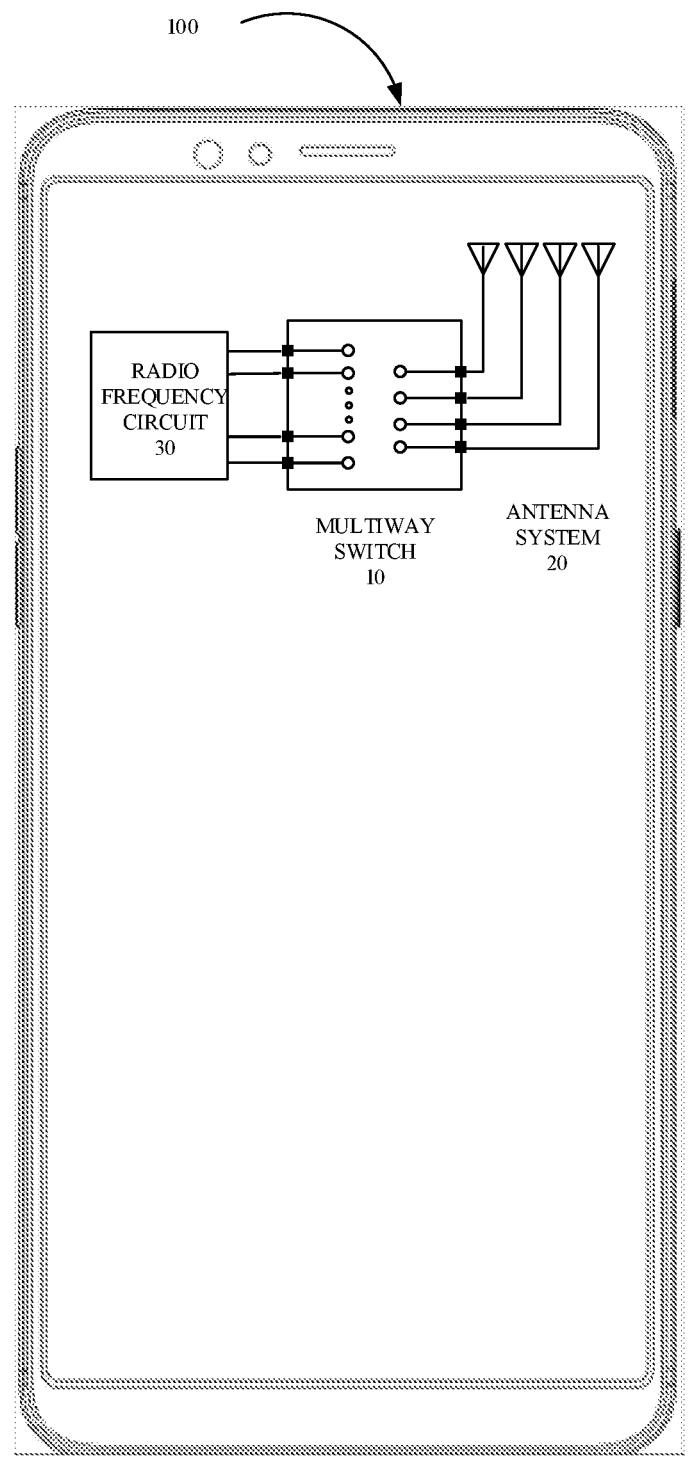
FIG. 1 is a schematic structural diagram illustrating a multiway switch according to an implementation of the disclosure.

Technical solutions in implementations of the present disclosure will be described clearly and completely hereinafter with reference to the accompanying drawings described in the previous chapter. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or device can also be included.

The term "embodiment" or "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The electronic device involved in the implementations of the present disclosure may include various handheld devices, in-vehicle devices, wearable devices, computing devices that have wireless communication functions or other processing devices connected to the wireless modem, as well as various forms of user equipments (UE), mobile stations (MS), terminal devices, and the like. For the convenience of description, the above-mentioned devices are collectively referred to as an electronic device.

At present, sounding reference signal (SRS) transmission via four antennas switching of a mobile phone is a mandatory option for China mobile communications corporation (CMCC) in the China mobile fifth generation (5G) Scale Test Technical White Paper_Terminal, which is optional in the 3rd generation partnership project (3GPP). Its main purpose is for a base station to determine quality and parameters of four channels via measuring uplink signals of the four antennas of the mobile phone, to perform a beamforming of a downlink massive multi-input multi-output (MIMO) antenna array on the four channels according to a channel reciprocity, and finally to obtain the best data transmission performance for a downlink 4×4 MIMO.

In order to satisfy requirements of SRS transmission via four antennas switching, implementations of the present disclosure provide a radio frequency architecture based on a simplified 4PnT antenna switch. Compared with a 3P3T/DPDT/multiway small switch switching scheme, the present switching scheme can reduce the number of series switches in each path (all or part of switches are integrated into the 4PnT switch), thereby reducing link loss and optimizing the overall transmission and reception performance of the terminal. The implementations of the present disclosure are described in detail below.

FIG. 1 is a schematic structural diagram illustrating a multiway switch 10 according to an implementation of the disclosure. The multiway switch 10 includes n T ports and four P ports. At least one of the n T ports is coupled with all of the four P ports (that is, fully-coupled), where n is an integer greater than or equal to 4, 4≤n. The multiway switch 10 is applicable to an electronic device 100. The electronic device 100 includes an antenna system 20 and a radio frequency circuit 30. The antenna system 20 includes four antennas. The four antennas correspond to the four P ports; specifically, the four antennas and the four P ports are in one-to-one correspondence.

The multiway switch 10 is configured to be coupled with the radio frequency circuit 30 and the antenna system 20 to implement a preset function of the electronic device 100. The preset function is a function of transmitting an SRS through the four antennas in turn, which can be understood as a four-port SRS function.

Figure 2:
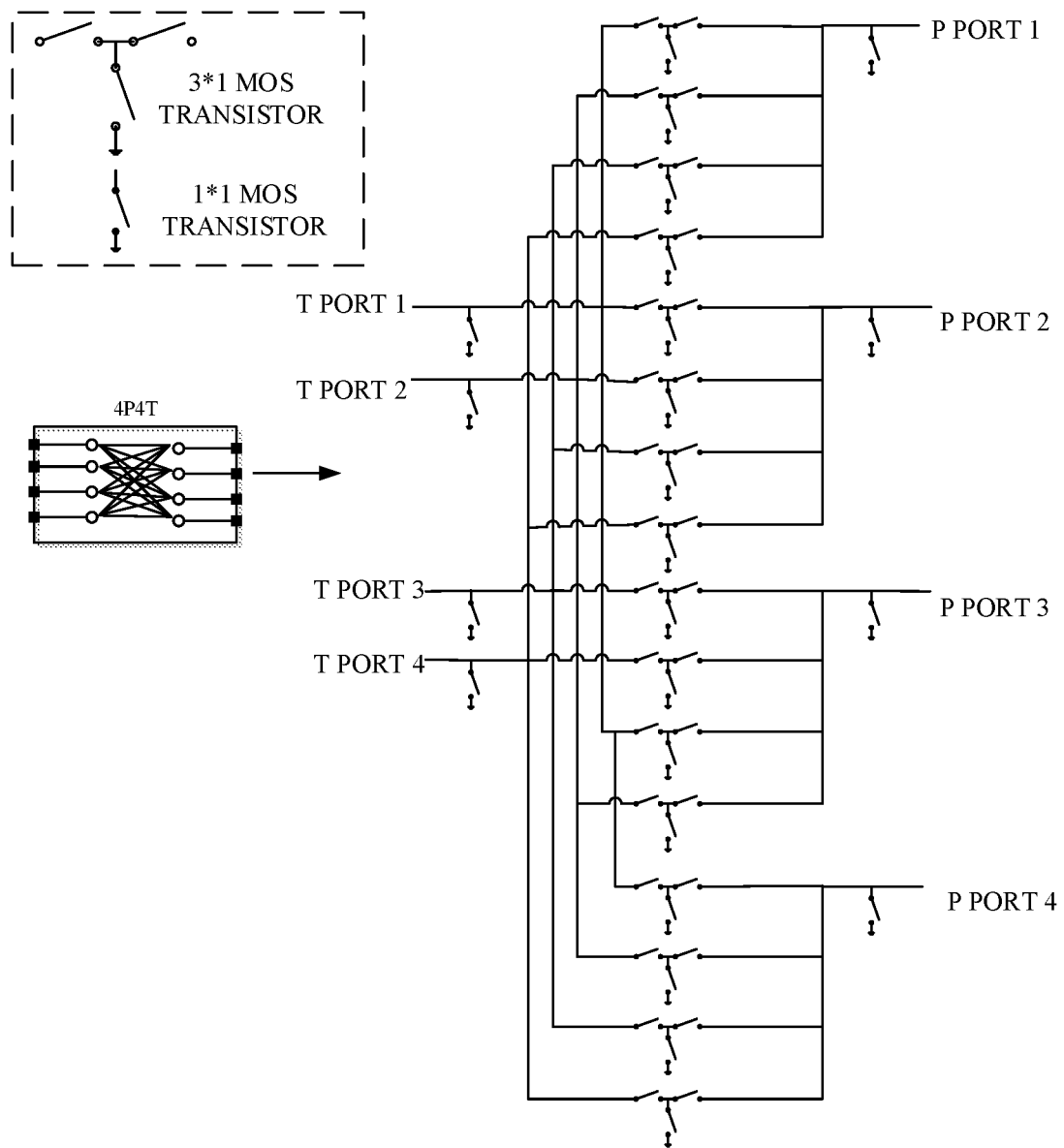
FIG. 2 is a schematic structural diagram illustrating a 4P4T full-coupling switch according to an implementation of the disclosure.

"P port" in the disclosure is the abbreviation of "pole port", which refers to ports coupled with antennas of the multiway switch. "T port" in the disclosure is the abbreviation of "throw port", which refers to ports coupled with radio frequency modules of the multiway switch. The multiway switch is a 4P4T switch for example. As illustrated in FIG. 2 for example, the four P ports are P port 1, P port 2, P port 3, and P port 4.

The concept of coupling, full coupling, or other kinds of coupling between the T ports and the P ports of the multiway switch described in the implementations of the disclosure refers to a state in which the T ports are coupled with the P ports through first switch transistors. One T port or one P port may be one port of a second switch transistor. The first switch transistors are configured to control a unidirectional conduction state between the T ports and the P ports (including a unidirectional conduction state from the T ports to the P ports and a unidirectional conduction state from the P ports to the T ports). The first switch transistor can be, for example, a switch array including three metal-oxide-semiconductor (MOS) transistors. When the first switch transistor is disconnected and not grounded, parasitic parameters will greatly affect performance of other connected ports. Therefore, the first switch transistor is implemented with three MOS transistors, where the three MOS transistors can be in a common source connection, that is, coupled at a common source. When the first switch transistor is disconnected, two MOS transistors at two ends are disconnected and one MOS transistor in the middle is grounded. The second switch transistor is configured to enable a corresponding port (T port or P port) and can be, for example, a MOS transistor. The specific configurations of the first switch transistor and the second switch transistor are not limited herein. As one implementation, the electronic device can control paths between the T ports and the P ports to switch on through the first switch transistors. As one implementation, the electronic device can be provided with a dedicated controller to be coupled with switch transistors of the multiway switch.

The expression of "transmitting an SRS through the four antennas corresponding to the four P ports in turn" refers to a process in which the electronic device interacts with a base station based on polling mechanism to determine quality of an uplink channel corresponding to each antenna.

The electronic device may be a mobile phone or other terminal devices supporting the fifth generation new radio (5G NR), such as a customer premise equipment (CPE) or a mobile wireless-fidelity (MIFI).

As at least one of the n T ports is fully coupled with the four P ports and other T ports are only coupled with one fixed antenna for receiving, the number of built-in field-effect transistors (FET), volume, and cost of the 4PnT switch can be reduced and performance can be improved. Details will be described hereinafter.

Figure 3:
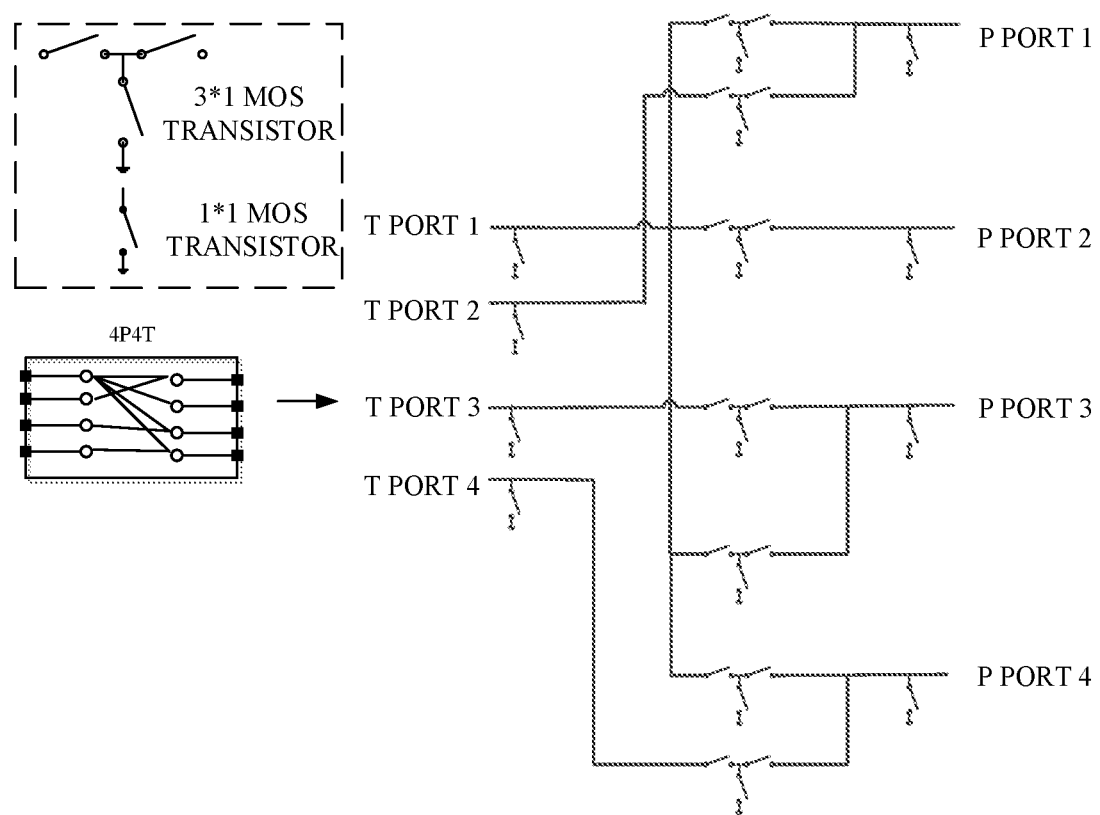
FIG. 3 is a schematic structural diagram illustrating a 4P4T simplified switch according to an implementation of the disclosure.

For example, assume n=4 (that is, the multiway switch includes four T ports, i.e., T port 1, T port 2, T port 3, and T port 4) and the multiway switch includes field-effect transistors; among the four T ports, if each T port is fully coupled with the four P ports, as illustrated in FIG. 2 of a schematic structural diagram of the multiway switch, the number of the field-effect transistors of the multiway switch is 4+4*4*3+4=56; if only one T port is coupled with the four P ports, as illustrated in FIG. 3 of a schematic structural diagram of the multiway switch, the number of the field-effect transistors of the multiway switch is 4+(1*4)±(4−1)*1)*3+4=29.

For another example, assume n=5 (that is, the multiway switch includes five T ports) and the multiway switch includes field-effect transistors; among the five T ports, if each T port is fully coupled with the four P ports, the number of the field-effect transistors of the multiway switch is 5+5*4*3+4=69; if only one T port is coupled with the four P ports, the number of the field-effect transistors of the multiway switch is 5+(1*4+(5−1)*1)*3+4=33.

In addition, the electronic device further includes a radio frequency transceiver. The radio frequency transceiver is coupled with the radio frequency circuit and constitutes a radio frequency system of the electronic device together with the radio frequency circuit, the multiway switch, and the antenna system.

By limiting the number of T ports that are fully coupled with the four P ports (in other words, full-coupling T ports), the number of switches of the radio frequency system of the electronic device can be effectively reduced. That is to say, the number of full-coupling T ports has a great influence on performance of the radio frequency system.

In this implementation, the electronic device includes the antenna system, the radio frequency circuit, and the multiway switch. The antenna system includes the four antennas and the multiway switch includes the n T ports and the four P ports. The multiway switch is configured to be coupled with the radio frequency circuit and the antenna system to implement the preset function of the electronic device, the preset function relates to transmitting an SRS through the four antennas corresponding to the four P ports in turn, such as based on a polling scheme, and can be comprehended as a four-port SRS.

In one possible implementation, $4 \leq n \leq 12$. Each of the four P ports is coupled with a corresponding antenna, specifically, one P port is coupled with one antenna and any two P ports are coupled with different antennas. The n T ports include first T ports and second T ports. The first T ports are m T ports that at least support a transmission function, and $0 < m \leq 11$. The second T ports are T ports other than the first T ports and only support a reception function or signal reception function. Thus, the n T ports include m first T ports and (n-m) second T ports. Each first T port is coupled with the four P ports. Each second T port is coupled with one of the four P ports. Among the second T ports, any two T second ports at the same frequency band are coupled with different P ports.

When the electronic device is in a downlink 4*4 multiple-input multiple-output (MIMO) mode, T ports and P ports in four downlink channels at the same frequency band are in one-to-one correspondence.

Considering that, in the 5G NR, the electronic device is at most operable in a dual-frequency uplink UL2*2 MIMO and downlink DL4*4 MIMO (simplified as a dual-frequency dual-transmit mode, the related descriptions will be similarly simplified hereinafter), that is, logically corresponds to eight signal receive paths and four signal transmit paths, which means that twelve T ports are included at most, accordingly, the value of n is less than or equal to 12.

The expression of "at least supporting the transmission function" refers to supporting a transmission-reception function (that is, a signal transmission-reception function) or supporting the transmission function. The number of the second T ports is greater than or equal to 1.

In this implementation, since the multiway switch includes the first T ports and the second T ports and the number of the second T ports is not 0, compared with a configuration in which all T ports are fully coupled with P ports, for the multiway switch provided herein, the number of switches is reduced. That is, the number of the switches of transmit paths and/or receive paths of the radio frequency system of the electronic device can be reduced, thereby reducing path loss, improving transmit power/sensitivity, data transmission rate in the 5G NR, and uplink and downlink coverage of the mobile phone, and reducing power consumption and cost.

As mentioned before, $4 \leq n \leq 12$ and $0 < m \leq 11$, with the understanding that the principles of the technical schemes provided herein can apply more generally to any possible configuration of T pots and P ports, n and m can have multiple possible values without conflict. The following aspects of the disclosure contribute to the advantages of the disclosure and each will be described in detail.

Terms referred to herein will be given below.

Single-frequency single-transmit mode: refer to an operating mode in which the electronic device can support single frequency band-one uplink (UL) transmit path or single frequency band-four downlink (DL) receive paths.

Dual-frequency single-transmit mode: refer to an operating mode in which the electronic device can support dual frequency band-one UL transmit path or dual frequency band-four DL receive paths.

Single-frequency dual-transmit mode: refer to an operating mode in which the electronic device can support single frequency band-two UL transmit paths or single frequency band-four DL receive paths.

Dual-frequency dual-transmit mode: refer to an operating mode in which the electronic device can support dual frequency band-two UL transmit paths or dual frequency band-four DL receive paths.

4PnT, n is an integer and $4 \leq n \leq 12$: refer to a specific multiway switch configuration in which the multiway switch is structured to have four P ports and n T ports.

In one possible implementation, n=4 and m=1 (that is, the multiway switch includes four T ports and one first T port). The electronic device is operable in at least one mode of: the single-frequency single-transmit mode and the dual-frequency single-transmit mode.

Figure 4A:
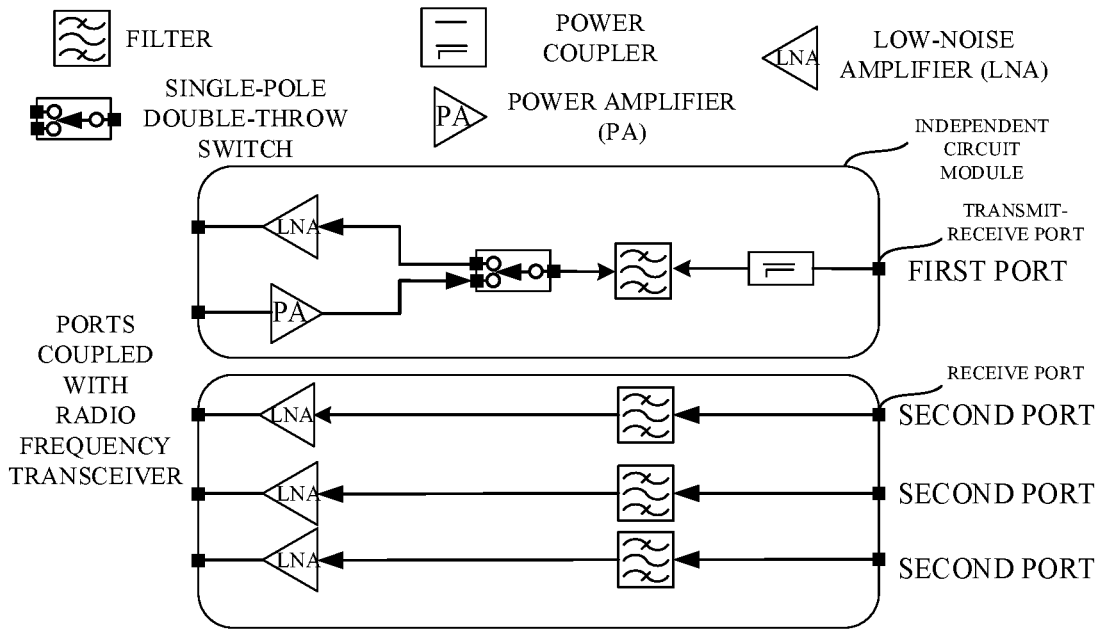
FIG. 4A is a schematic structural diagram illustrating a radio frequency circuit of an electronic device according to an implementation of the disclosure.
Figure 4B:
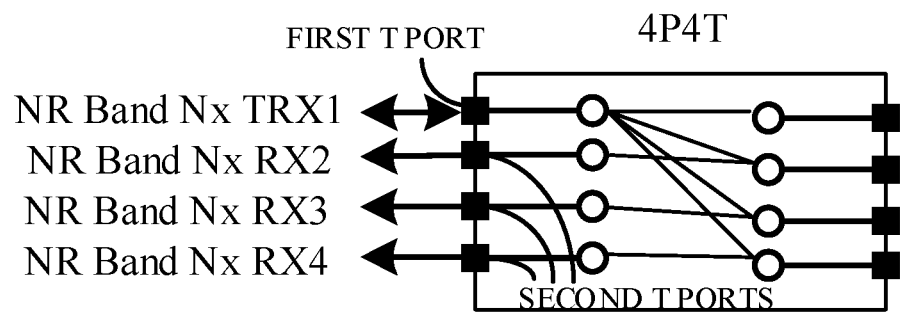
FIG. 4B is a schematic structural diagram illustrating a multiway switch of an electronic device according to an implementation of the disclosure.

In the case that the electronic device is operable in the single-frequency single-transmit mode, the electronic device logically includes four receiver circuits (can be comprehended as a circuit for receiving and/or processing signals) and one transmitter circuit (can be comprehended as a circuit for transmitting and/or processing signals). Since n=4 and m=1, the number of field-effect transistors corresponding to the multiway switch is 4+(1*4+(4−1)*1)*3+4=29. The one transmitter circuit can correspond to one first port that supports the transmission-reception function and the one first port is coupled with one first T port of the multiway switch. In addition, one of the four receiver circuits can be integrated with the one transmitter circuit to be coupled with the one first port, and the remaining three receiver circuits correspond to (in one-to-one correspondence with) three second ports that only support the reception function, where each second port is coupled with a corresponding second T port of the multiway switch. In this case, a schematic structure of a corresponding radio frequency circuit is illustrated in FIG. 4A and a schematic structure of a corresponding multiway switch is illustrated in FIG. 4B. The receiver circuit may include a low noise amplifier (LNA) and a filter, where the LNA is coupled with the filter and the LNA has an output port that is coupled with the radio frequency transceiver. The transmitter circuit may include a power amplifier (PA), a filter, and a coupler (or a power coupler). The receiver circuit and the transmitter circuit can be integrated into a transceiver circuit (can be comprehended as a circuit for transmitting, receiving, and/or processing signals) through a single-pole double-throw (SPDT) switch. That is, an input port of the LNA and an output port of the PA are coupled with the SPDT switch. The SPDT switch is coupled with the filter and the filter is in turn coupled with the power coupler, where the power coupler is provided with the one first port coupled with the one first T port. "NR Band Nx" indicates a first frequency band supported by the electronic device in the 5G NR. "NR Band Ny" indicates a second frequency band supported by the electronic device in the 5G NR. "TRX" represents a first T port that supports the transmission-reception function. "TX" represents a first T port that supports the transmission function. "RX" represents a second T port supporting the reception function.

Figure 5A:
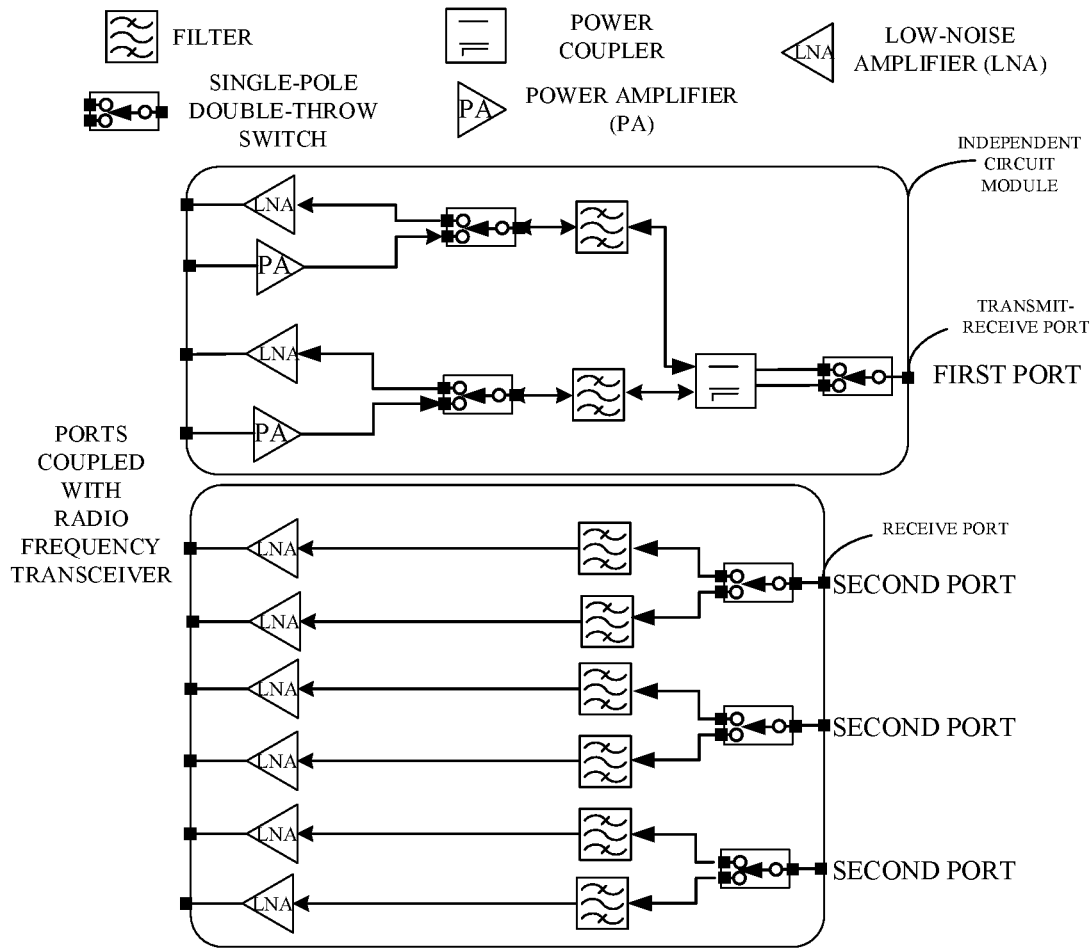
FIG. 5A is a schematic structural diagram illustrating another radio frequency circuit of an electronic device according to an implementation of the disclosure.
Figure 5B:
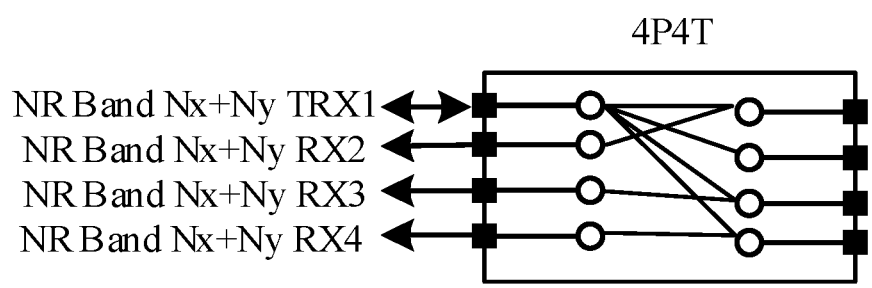
FIG. 5B is a schematic structural diagram illustrating another multiway switch of an electronic device according to an implementation of the disclosure.

In the case that the electronic device is operable in the dual-frequency single-transmit mode, the electronic device logically includes eight receiver circuits and two transmitter circuits. Since n=4 and m=1, the two transmitter circuits can be integrated to be coupled with one first port that supports the transmission-reception function and the one first port is coupled with one first T port of the multiway switch. In addition, two of the eight receiver circuits can be integrated into the foregoing one first port; the remaining six receiver circuits are divided into three groups, where each group includes two receiver circuits at different frequency bands and corresponds to one second port that only supports the reception function, and each second port is coupled with one second T port of the multiway switch. In this case, a schematic structure of a corresponding radio frequency circuit is illustrated in FIG. 5A and a schematic structure of a corresponding multiway switch is illustrated in FIG. 5B. Two transceiver circuits can be integrated into a transceiver integrated circuit (can be comprehended as an integrated circuit for transmitting, receiving, and/or processing signals) through a single-pole double-throw switch, and share a power coupler. That is, a filter of each of the two transceiver circuits is coupled with the power coupler, the power coupler is coupled with a single-pole double-throw switch, and one port of the single-pole double-throw switch is used as the one first port to be coupled with the one first T port. The specific configuration of the transmitter circuit and the receiver circuit, and definitions related to the multiway switch are similar to the foregoing implementations and will not be described herein again. In addition, it can be understood that, the exemplary matching manner of the radio frequency circuit and the multiway switch includes but is not limited to the structure of the drawings.

It can be seen that for the case where n=4 and m=1, the multiway switch of the implementation of the disclosure can enable the electronic device to be operable in the single-frequency single-transmit mode and/or the dual-frequency single-transmit mode. It is beneficial to simplifying the radio frequency (RF) architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

In one possible implementation, n=4 and m=2 or 3 (that is, the multiway switch includes four T ports and two or three first T ports). The electronic device is operable in at least one mode of: the single-frequency single-transmit mode, the single-frequency dual-transmit mode, the dual-frequency single-transmit mode, and the dual-frequency dual-transmit mode.

Figure 6A:
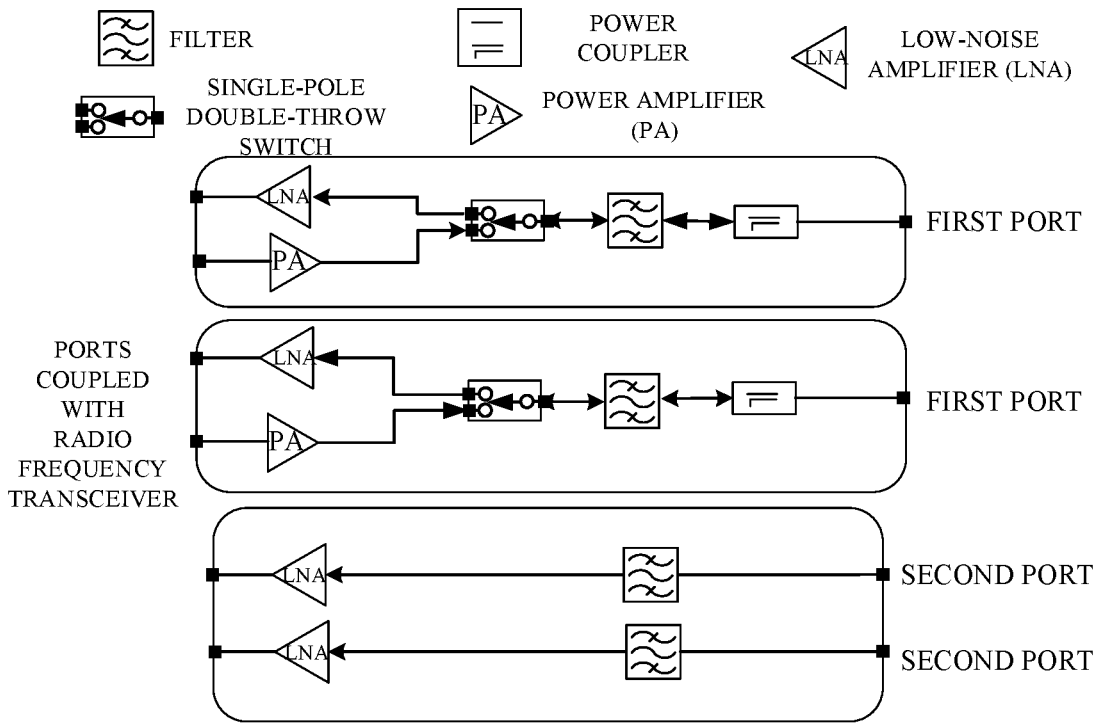
FIG. 6A is a schematic structural diagram illustrating yet another radio frequency circuit of an electronic device according to an implementation of the disclosure.
Figure 6B:
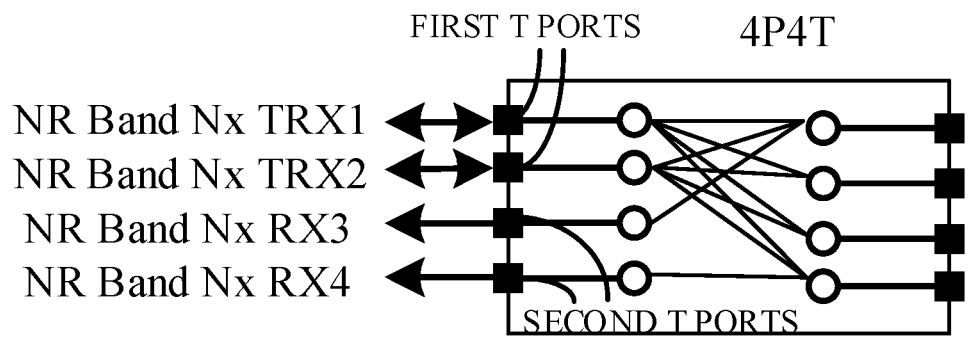
FIG. 6B is a schematic structural diagram illustrating yet another multiway switch of an electronic device according to an implementation of the disclosure.

In the case that the electronic device is operable in the single-frequency dual-transmit mode, the electronic device logically includes four receiver circuits and two transmitter circuits. Since n=4 and m=2, the number of field-effect transistors corresponding to the multiway switch is 4+(2*4+ (4−2)*1)*3+4=38. The two transmitter circuits correspond to (in one-to-one correspondence with) two first ports that support the transmission-reception function, and each first port is coupled with one first T port of the multiway switch. In addition, among the four receiver circuits and the two transmitter circuits, one receiver circuit and one transmitter circuit can be integrated to be coupled with a corresponding first port, and another receiver circuit and the other transmitter circuit can be integrated to be coupled with another corresponding first port; the remaining two receiver circuits correspond to (in one-to-one correspondence with) two second ports that only support the reception function, where each second port is coupled with a corresponding second T port of the multiway switch. In this case, a schematic structure of a corresponding radio frequency circuit is illustrated in FIG. 6A and a schematic structure of a corresponding multiway switch is illustrated in FIG. 6B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

Figure 7A:
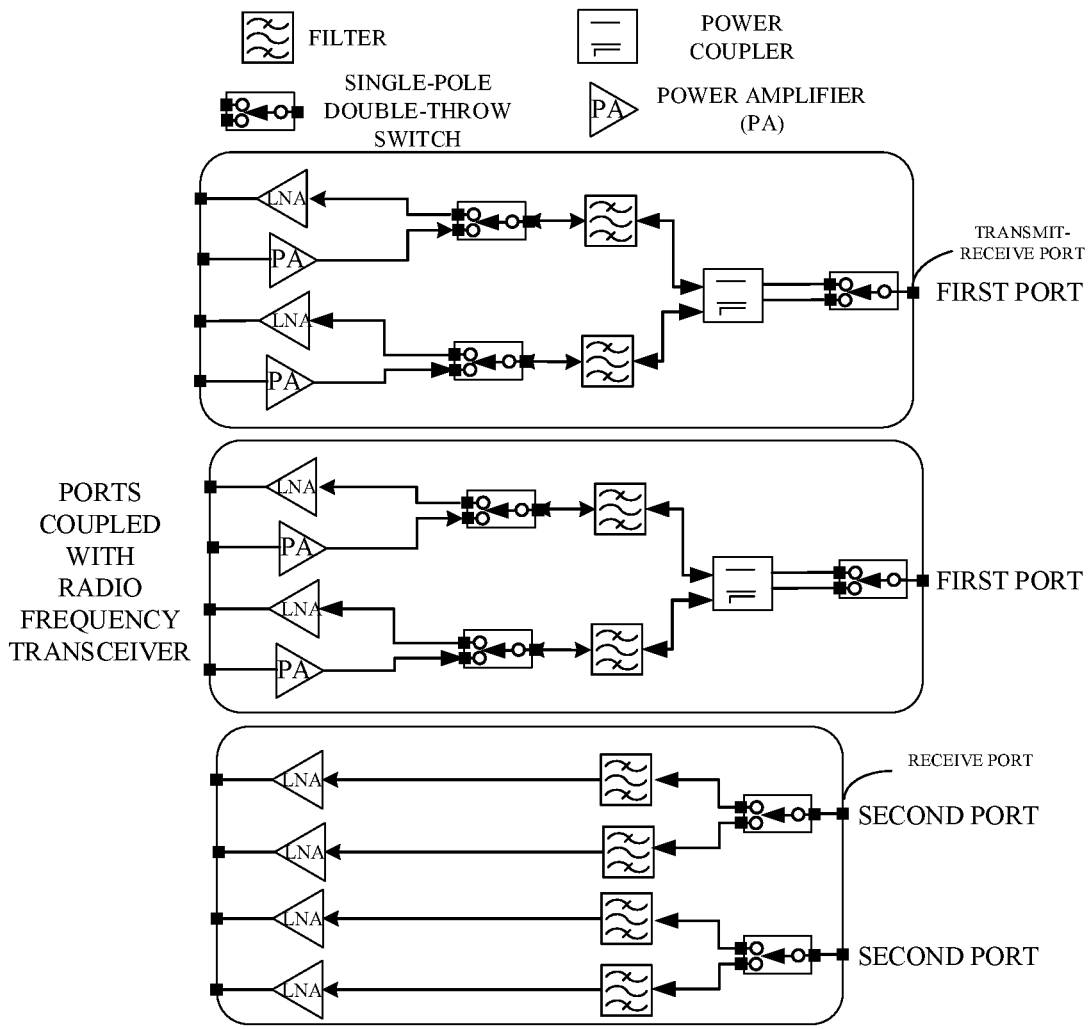
FIG. 7A is a schematic structural diagram illustrating still another radio frequency circuit of an electronic device according to an implementation of the disclosure.
Figure 7B:
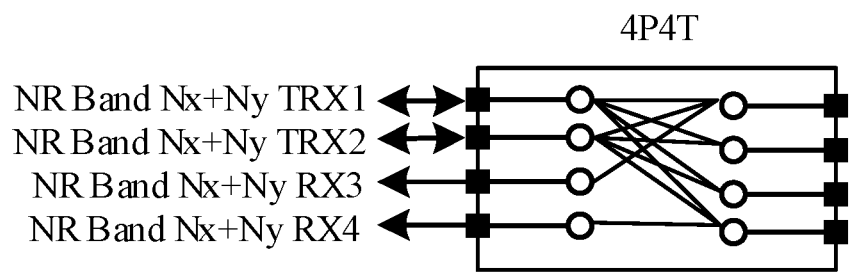
FIG. 7B is a schematic structural diagram illustrating still another multiway switch of an electronic device according to an implementation of the disclosure.

In the case that the electronic device is operable in the dual-frequency dual-transmit mode, the electronic device logically includes eight receiver circuits and four transmitter circuits. Since n=4 and m=2, the four transmitter circuits are divided into two groups, where each group includes two transmitter circuits at different frequency bands and corresponds to one first port that supports the transmission-reception function, and each first port (two first ports in total) is coupled with one first T port of the multiway switch. The eight receiver circuits are divided into four groups, with each group including two receiver circuits at different frequency bands. Among the four groups of receiver circuits, one group of receiver circuits and one of the two groups of transmitter circuits are integrated to be coupled with one first port of the two first ports, and another group of receiver circuits and the other one of the two groups of transmitter circuits are integrated to be coupled with the other one first port of the two first ports; the remaining two groups of receiver circuits correspond to (in one-to-one correspondence with) two second ports that only support the reception function, and each second port is coupled with one second T port of the multiway switch. In this case, a schematic structure of a corresponding radio frequency circuit is illustrated in FIG. 7A and a schematic structure of a corresponding multiway switch is illustrated in FIG. 7B. Two receiver circuits can be integrated into a receiver integrated circuit (can be comprehended as an integrated circuit for receiving and processing signals) through a SPDT switch, and one port of the SPDT switch is used as one of the two second ports to be coupled with a corresponding second T port. Two receiver circuits of each receiver integrated circuit are operable at different frequency bands. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

It can be concluded that for the case where n=4 and m=2 or 3, the multiway switch of the implementation of the disclosure can enable the electronic device to be operable in the single-frequency single-transmit mode, the single-frequency dual-transmit mode, the dual-frequency single-transmit mode, or the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

As can be seen, for the transmit paths and the receive paths of the radio frequency system of the electronic device, the transmit paths can include one single independent switch (a 4P4T switch) or two independent switches (a SPDT switch and a 4P4T switch), and the receive paths can include one single independent switch (a 4P4T switch) or two independent switches (a SPDT switch and a 4P4T switch). That is to say, by integrating more switch functions of the transmit paths and the receive paths of the radio frequency system into the 4P4T switch, the number of independent switches of the transmit paths and the receive paths can be effectively reduced.

In one possible implementation, $n=5$ and $m=1$ (that is, the multiway switch includes five T ports and one first T port). The electronic device is operable in the single-frequency single-transmit mode and the dual-frequency single-transmit mode.

Figure 8A:
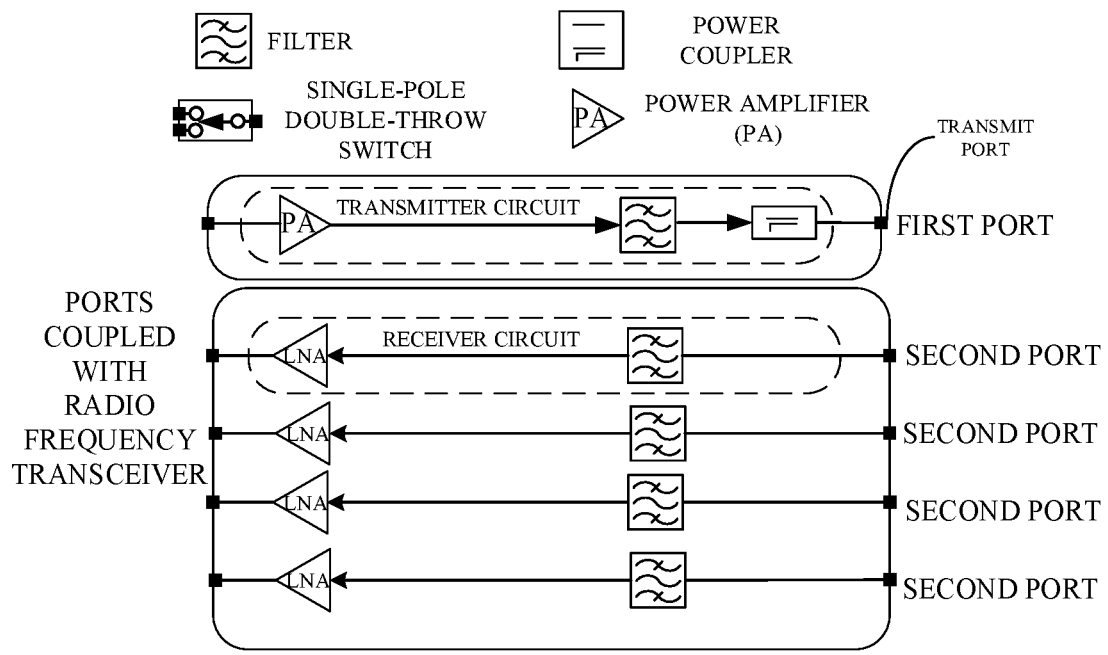
FIG. 8A is a schematic structural diagram illustrating still another radio frequency circuit of an electronic device according to an implementation of the disclosure.
Figure 8B:
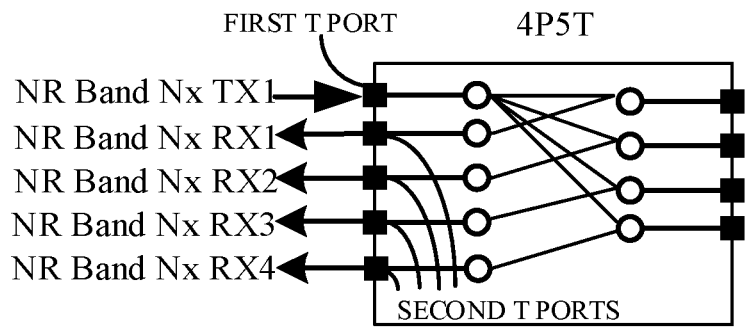
FIG. 8B is a schematic structural diagram illustrating still another multiway switch of an electronic device according to an implementation of the disclosure.

In the case that the electronic device is operable in the single-frequency single-transmit mode, the electronic device logically includes four receiver circuits and one transmitter circuit. Since $n=5$ and $m=1$, the one transmitter circuit corresponds to a first port that supports the transmission-reception function and the first port is coupled with one first T port of the multiway switch. In addition, the four receiver circuits correspond to (in one-to-one correspondence with) four second ports, where each second port is coupled with one second T port of the multiway switch. In this case, a schematic structure of a corresponding radio frequency circuit is illustrated in FIG. 8A and a schematic structure of a corresponding multiway switch is illustrated in FIG. 8B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

Figure 9A:
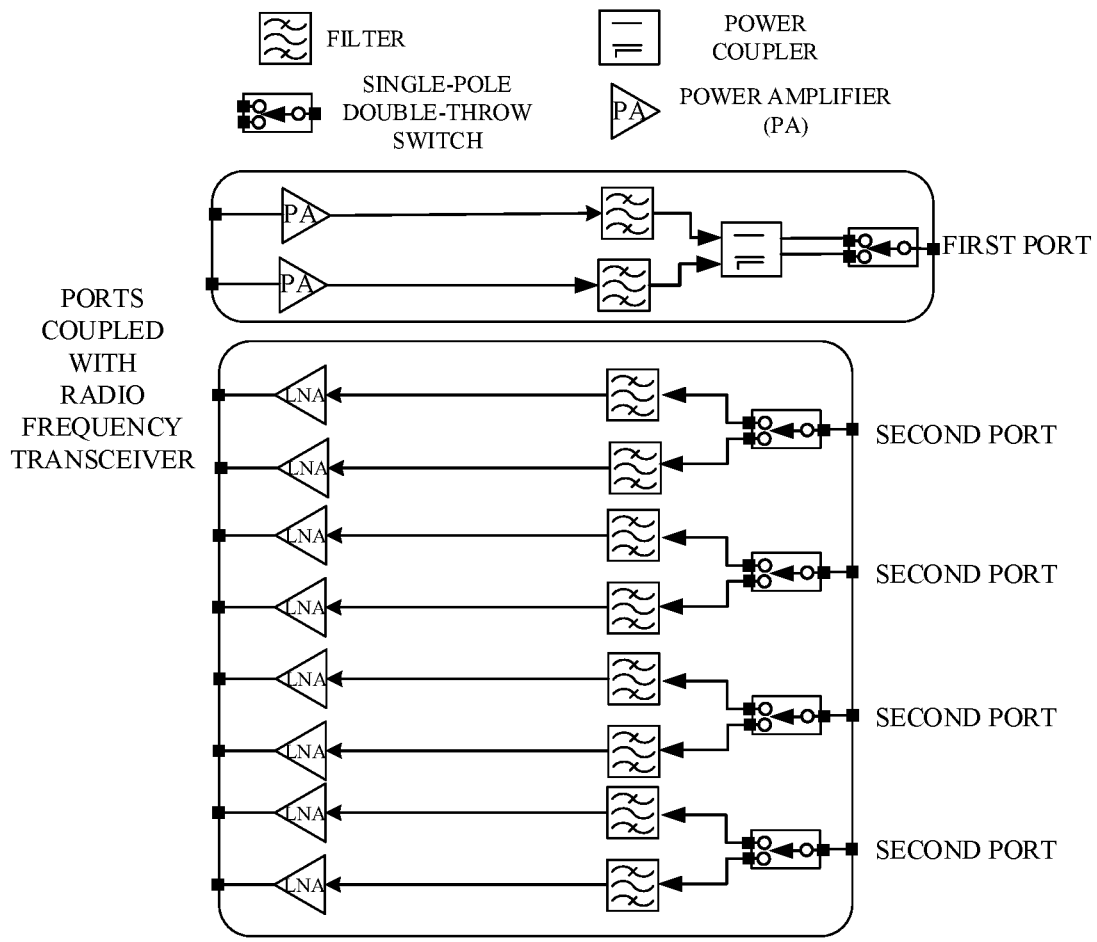
FIG. 9A is a schematic structural diagram illustrating still another radio frequency circuit of an electronic device according to an implementation of the disclosure.
Figure 9B:
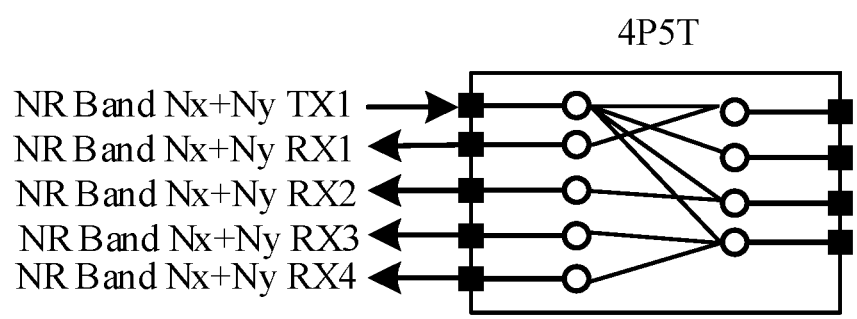
FIG. 9B is a schematic structural diagram illustrating still another multiway switch of an electronic device according to an implementation of the disclosure.

In the case that the electronic device is operable in the dual-frequency single-transmit mode, the electronic device logically includes eight receiver circuits and two transmitter circuits. Since $n=5$ and $m=1$, the two transmitter circuits can be integrated to be coupled with a first port and the first port is coupled with a first T port of the multiway switch. In addition, the eight receiver circuits are divided into four groups. Each group includes two receiver circuits at different frequency bands and corresponds to one second port that only supports the reception function, and each second port is coupled with one second T port of the multiway switch. In this case, a schematic structure of a corresponding radio frequency circuit is illustrated in FIG. 9A and a schematic structure of a corresponding multiway switch is illustrated in FIG. 9B. Two transmitter circuits can be integrated into a transmitter integrated circuit (can be comprehended as an integrated circuit for transmitting and processing signals) through a SPDT switch and share a power coupler, and one port of the SPDT switch is used as the first port to be coupled with the first T port. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

It can be found that for the case where $n=5$ and $m=1$, the multiway switch of the implementation of the disclosure can enable the electronic device to be operable in the single-frequency single-transmit mode or the dual-frequency single-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

In one possible implementation, $n=5$ and $m=2$, 3, or 4 (that is, the multiway switch includes five T ports and two, three, or four first T ports). The electronic device is operable in at least one mode of: the single-frequency single-transmit mode, the single-frequency dual-transmit mode, the dual-frequency single-transmit mode, and the dual-frequency dual-transmit mode.

Figure 10A:
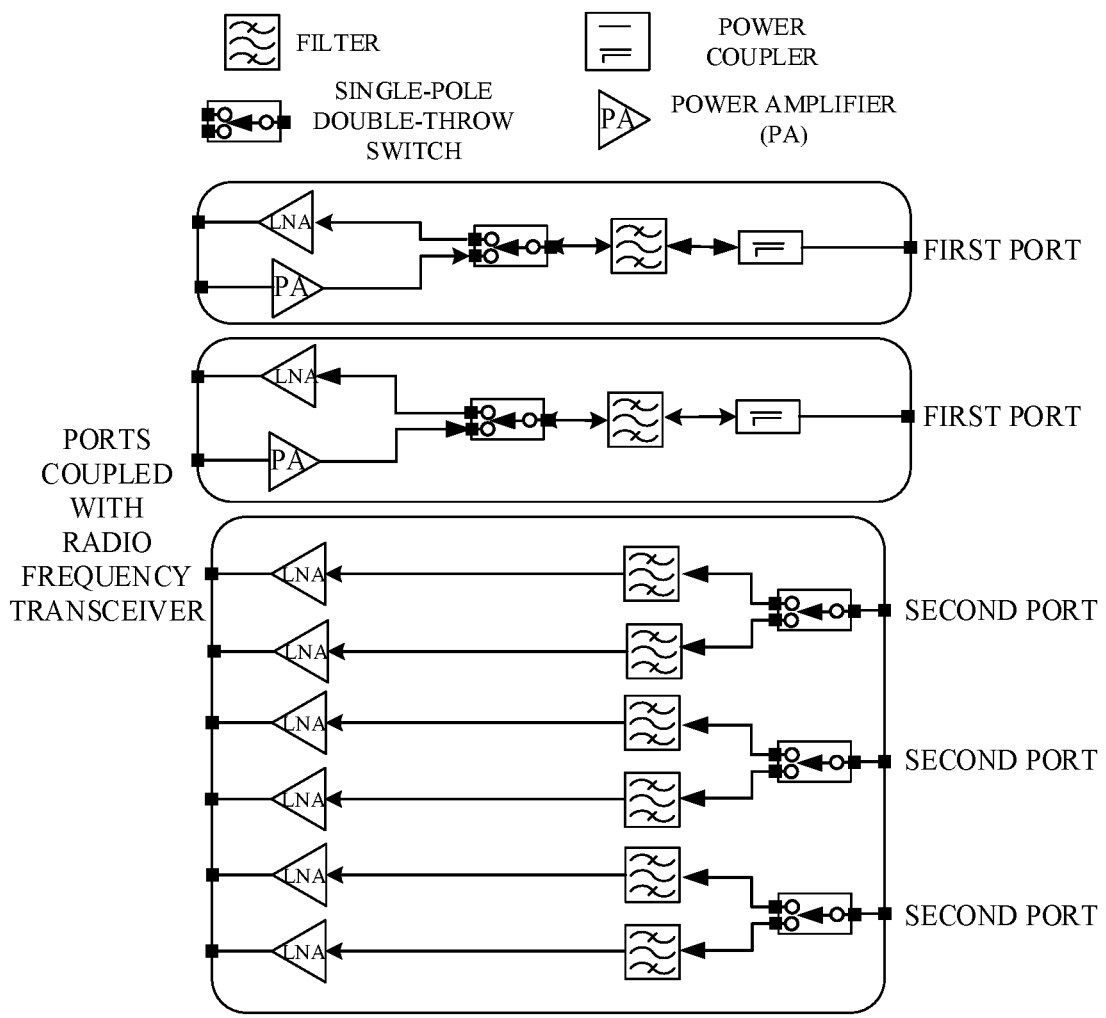
FIG. 10A is a schematic structural diagram illustrating still another radio frequency circuit of an electronic device according to an implementation of the disclosure.
Figure 10B:
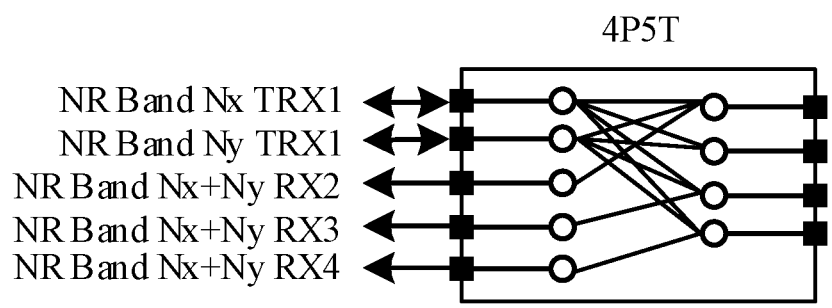
FIG. 10B is a schematic structural diagram illustrating still another multiway switch of an electronic device according to an implementation of the disclosure.

In the case that the electronic device is operable in the dual-frequency single-transmit mode, the electronic device logically includes eight receiver circuits and two transmitter circuits. Since $n=5$ and $m=2$, the two transmitter circuits correspond to (in one-to-one correspondence with) two first ports and each first port is coupled with one first T port of the multiway switch. In addition, among the eight receiver circuits, one receiver circuit and one of the two transmitter circuits can be integrated to be coupled with one of the two first ports, and another receiver circuit and the other one of the two transmitter circuits can be integrated to be coupled with the other one of the two first ports; the remaining six receiver circuits are divided into three groups, where each group includes two receiver circuits at different frequency bands or includes only one receiver circuit, besides, each group corresponds to one second port that only supports the reception function, and each second port is coupled with a second T port of the multiway switch. In this case, a schematic structure of a corresponding radio frequency circuit is illustrated in FIG. 10A and a schematic structure of a corresponding multiway switch is illustrated in FIG. 10B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

It can be seen that for the case where $n=5$ and $m=2$, 3, or 4, the multiway switch of the implementation of the disclosure can enable the electronic device to be operable in the single-frequency single-transmit mode, the single-frequency dual-transmit mode, the dual-frequency single-transmit mode, or the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

As can be seen, for the transmit paths and the receive paths of the radio frequency system of the electronic device, the transmit paths can include one single independent switch (a 4P5T switch) or two independent switches (a SPDT switch and a 4P5T switch), and the receive paths can include one single independent switch (a 4P5T switch) or two independent switches (a SPDT switch and a 4P5T switch). That is to say, by integrating more switch functions of the transmit paths and the receive paths of the radio frequency system into the 4P5T switch, the number of independent switches of the transmit paths and the receive paths can be effectively reduced.

In one possible implementation, n=6 and m=1 (that is, the multiway switch includes six T ports and one first T port). The electronic device is operable in the dual-frequency single-transmit mode.

It can be revealed that for the case where n=6 and m=1, the multiway switch of the implementation of the disclosure can enable the electronic device to be operable in the dual-frequency single-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

In one possible implementation, n=6 and m=2, 3, 4, or 5 (that is, the multiway switch includes six T ports and two, three, four, or five first T ports). The electronic device is operable in at least one mode of: the single-frequency dual-transmit mode, the dual-frequency single-transmit mode, and the dual-frequency dual-transmit mode.

Figure 11A:
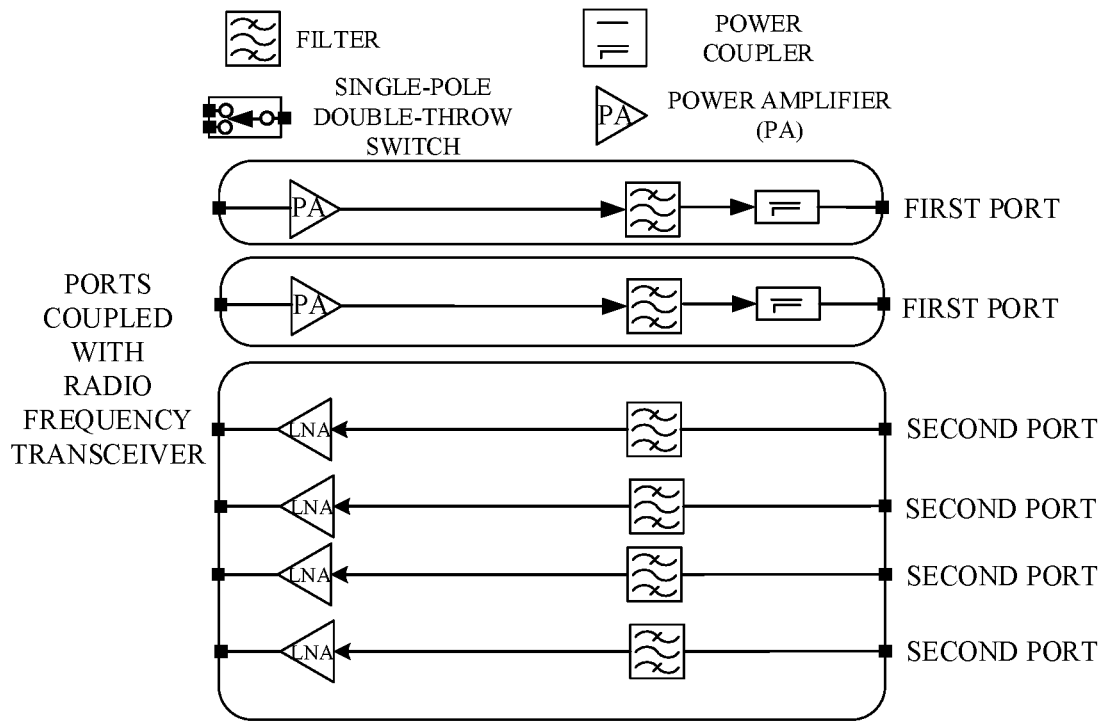
FIG. 11A is a schematic structural diagram illustrating still another radio frequency circuit of an electronic device according to an implementation of the disclosure.
Figure 11B:
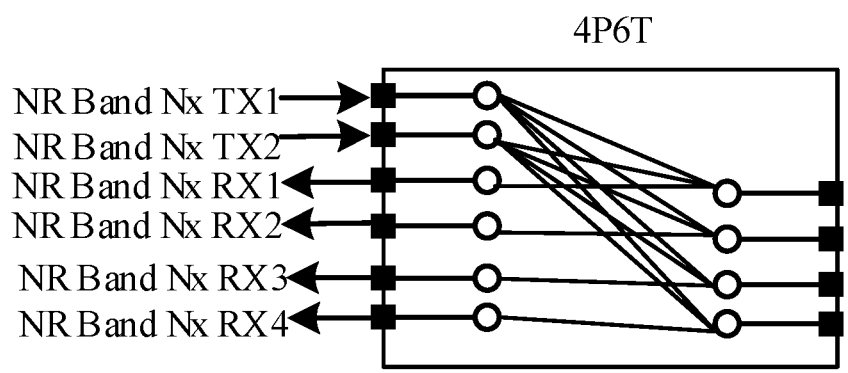
FIG. 11B is a schematic structural diagram illustrating still another multiway switch of an electronic device according to an implementation of the disclosure.

In the case that the electronic device is operable in the single-frequency dual-transmit mode, the electronic device logically includes four receiver circuits and two transmitter circuits. Since n=6 and m=2, the number of MOS transistors corresponding to the multiway switch is 6+(2*4+(6−2)*1)*3+4=46. The two transmitter circuits correspond to (in one-to-one correspondence with) two first ports and each first port is coupled with one first T port of the multiway switch. In addition, the four receiver circuits correspond to (in one-to-one correspondence with) four second ports that only support the reception function, where each second port is coupled with a corresponding second T port of the multiway switch. In this case, a schematic structure of a corresponding radio frequency circuit is illustrated in FIG. 11A and a schematic structure of a corresponding multiway switch is illustrated in FIG. 11B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

Figure 12A:
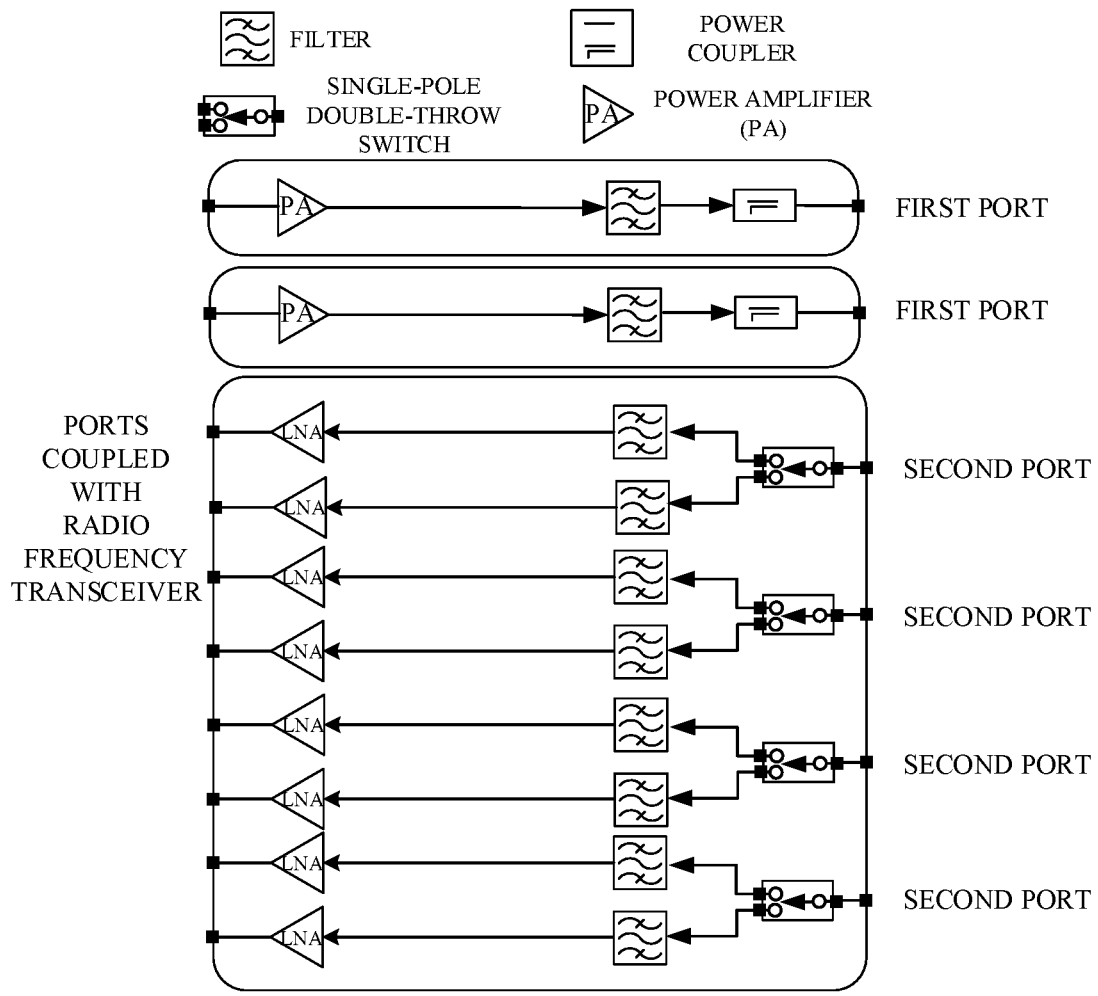
FIG. 12A is a schematic structural diagram illustrating still another radio frequency circuit of an electronic device according to an implementation of the disclosure.
Figure 12B:
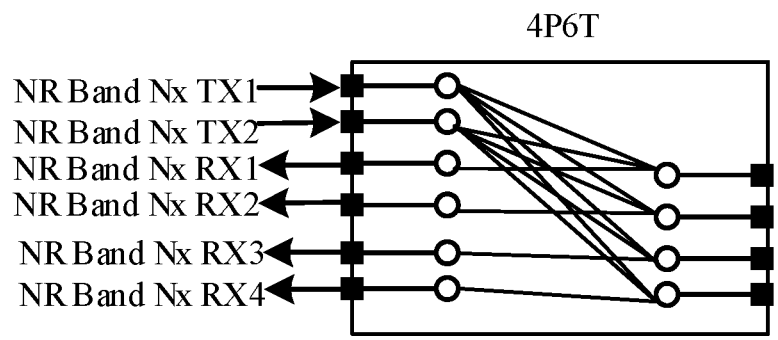
FIG. 12B is a schematic structural diagram illustrating still another multiway switch of an electronic device according to an implementation of the disclosure.

In the case that the electronic device is operable in the dual-frequency single-transmit mode, the electronic device logically includes eight receiver circuits and two transmitter circuits. Since n=6 and m=2, the number of MOS transistors corresponding to the multiway switch is 6+(2*4+(6−2)*1)*3+4=46. The two transmitter circuits correspond to (in one-to-one correspondence with) two first ports and each first port is coupled with one first T port of the multiway switch. In addition, the eight receiver circuits are divided into four groups. Each group includes two receiver circuits at different frequency bands and corresponds to one second port that only supports the reception function, and each second port is coupled with a corresponding second T port of the multiway switch. In this case, a schematic structure of a corresponding radio frequency circuit is illustrated in FIG. 12A and a schematic structure of a corresponding multiway switch is illustrated in FIG. 12B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

Figure 13A:
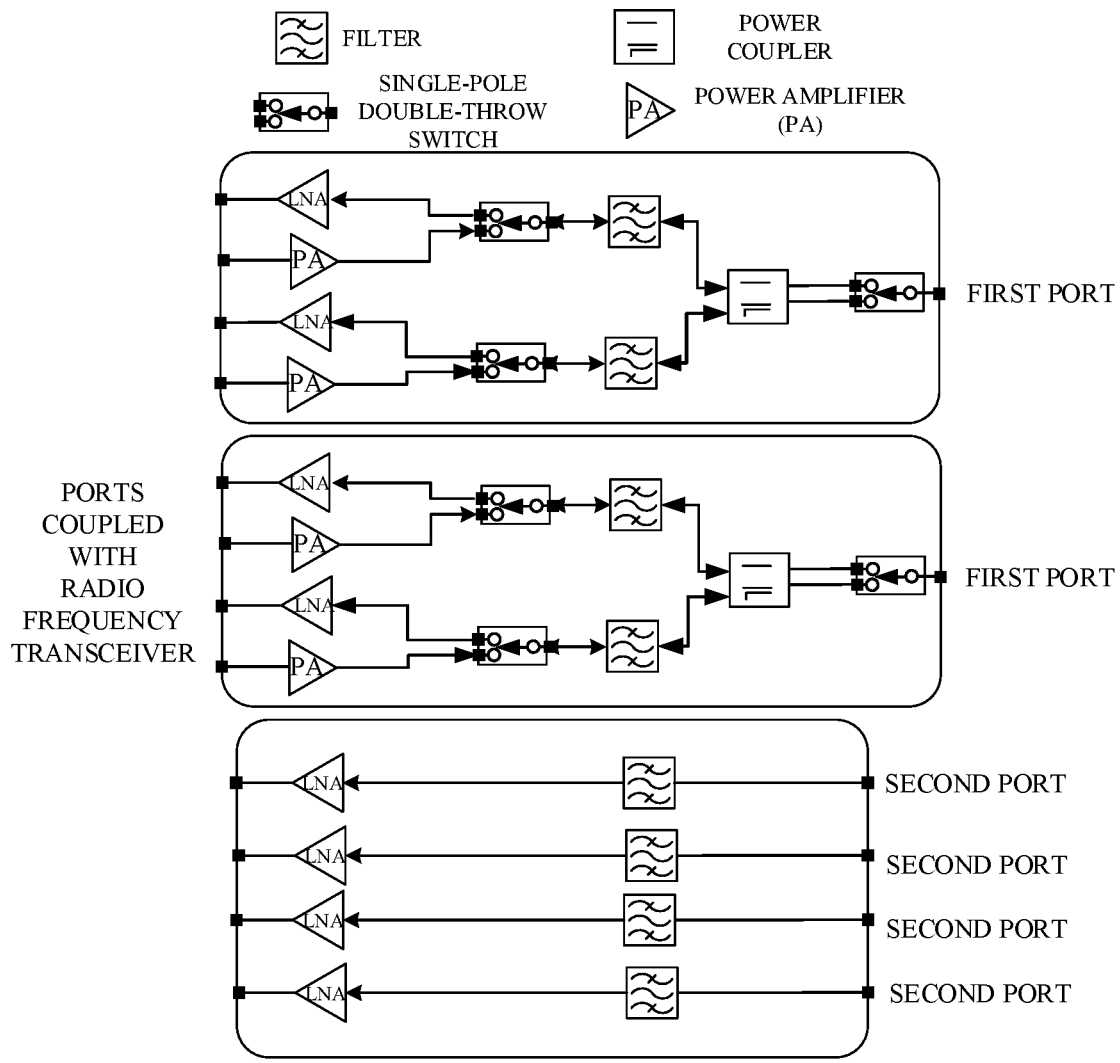
FIG. 13A is a schematic structural diagram illustrating still another radio frequency circuit of an electronic device according to an implementation of the disclosure.
Figure 13B:
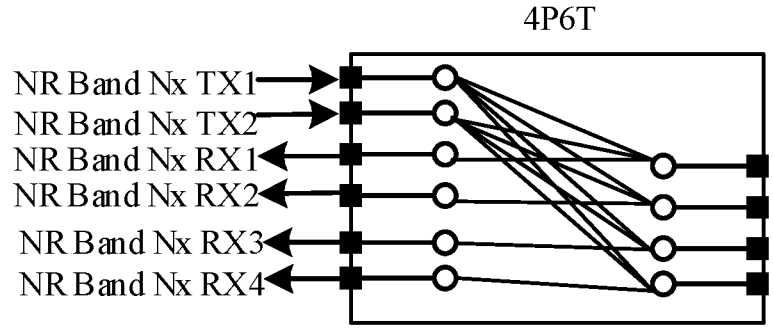
FIG. 13B is a schematic structural diagram illustrating still another multiway switch of an electronic device according to an implementation of the disclosure.

In the case that the electronic device is operable in the dual-frequency dual-transmit mode, the electronic device logically includes eight receiver circuits and four transmitter circuits. Since n=6 and m=2, the number of MOS transistors corresponding to the multiway switch is 6+(2*4+(6−2)*1)*3+4=46. The four transmitter circuits are divided into two groups, where each group includes two transmitter circuits at different frequency bands and corresponds to one first port, and each first port (two first ports in total) is coupled with one first T port of the multiway switch. In addition, the eight receiver circuits are divided into four groups, with each group including two receiver circuits at different frequency bands. Among the four groups of receiver circuits, one group of receiver circuits and one of the two groups of transmitter circuits are integrated to be coupled with one first port of the two first ports, and another group of receiver circuits and the other one of the two groups of transmitter circuits are integrated to be coupled with the other one first port of the two first ports; four receiver circuits included in the remaining two groups correspond to (in one-to-one correspondence with) four second ports, and each second port is coupled with one second T port of the multiway switch. In this case, a schematic structure of a corresponding radio frequency circuit is illustrated in FIG. 13A and a schematic structure of a corresponding multiway switch is illustrated in FIG. 13B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

Figure 14A:
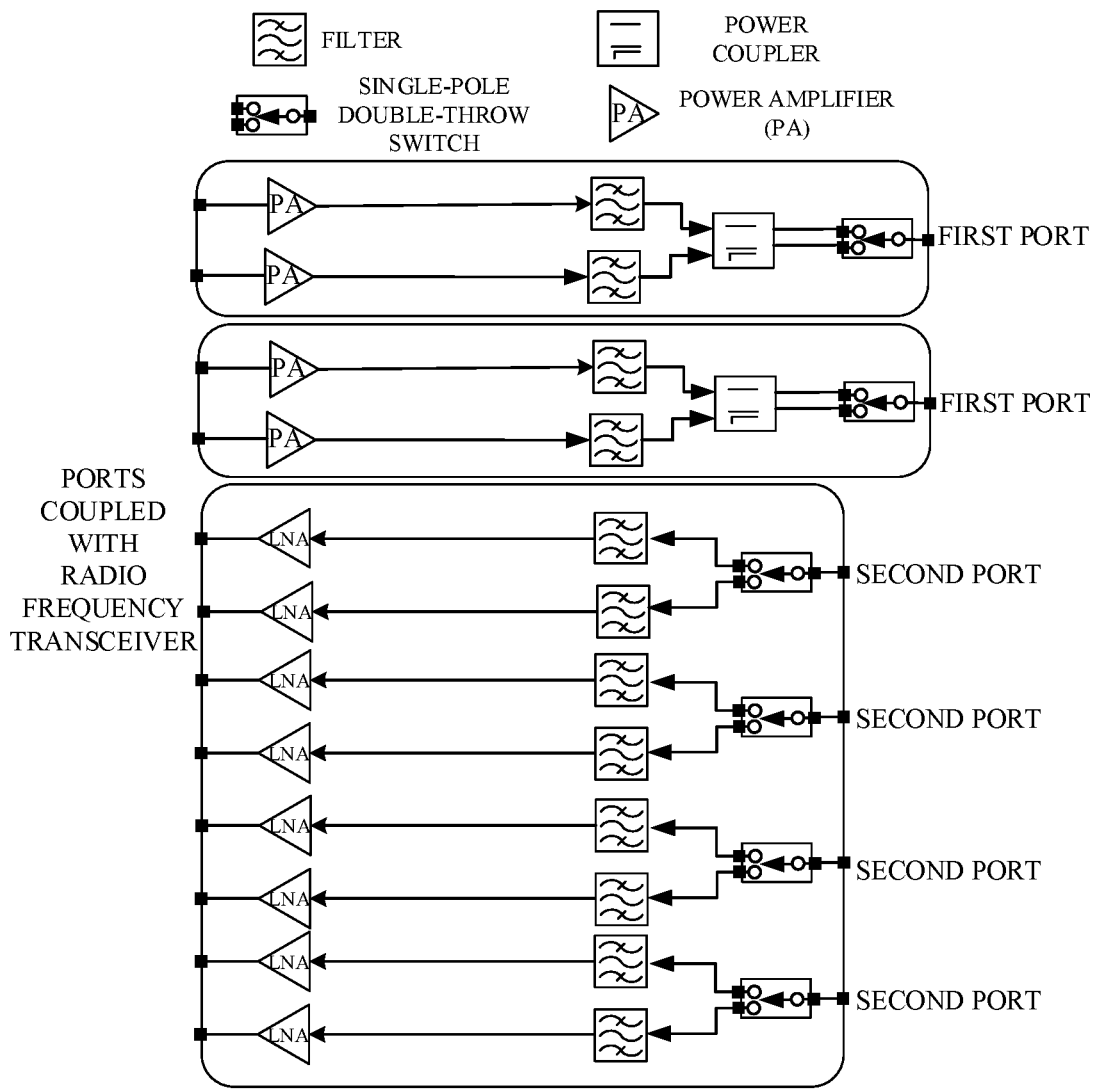
FIG. 14A is a schematic structural diagram illustrating still another radio frequency circuit of an electronic device according to an implementation of the disclosure.
Figure 14B:
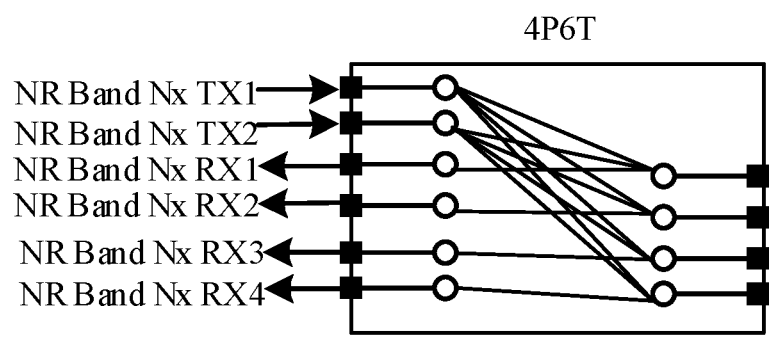
FIG. 14B is a schematic structural diagram illustrating still another multiway switch of an electronic device according to an implementation of the disclosure.

Alternatively, the four transmitter circuits can be divided into two groups, where each group includes two transmitter circuits at different frequency bands and corresponds to one first port, and each first port is coupled with a corresponding first T port of the multiway switch. In addition, the eight receiver circuits are divided into four groups. Each group includes two receiver circuits at different frequency bands and corresponds to one second port, and each second port is coupled with a corresponding second T port of the multiway switch. In this case, a schematic structure of a corresponding radio frequency circuit is illustrated in FIG. 14A and a schematic structure of a corresponding multiway switch is illustrated in FIG. 14B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

Figure 15A:
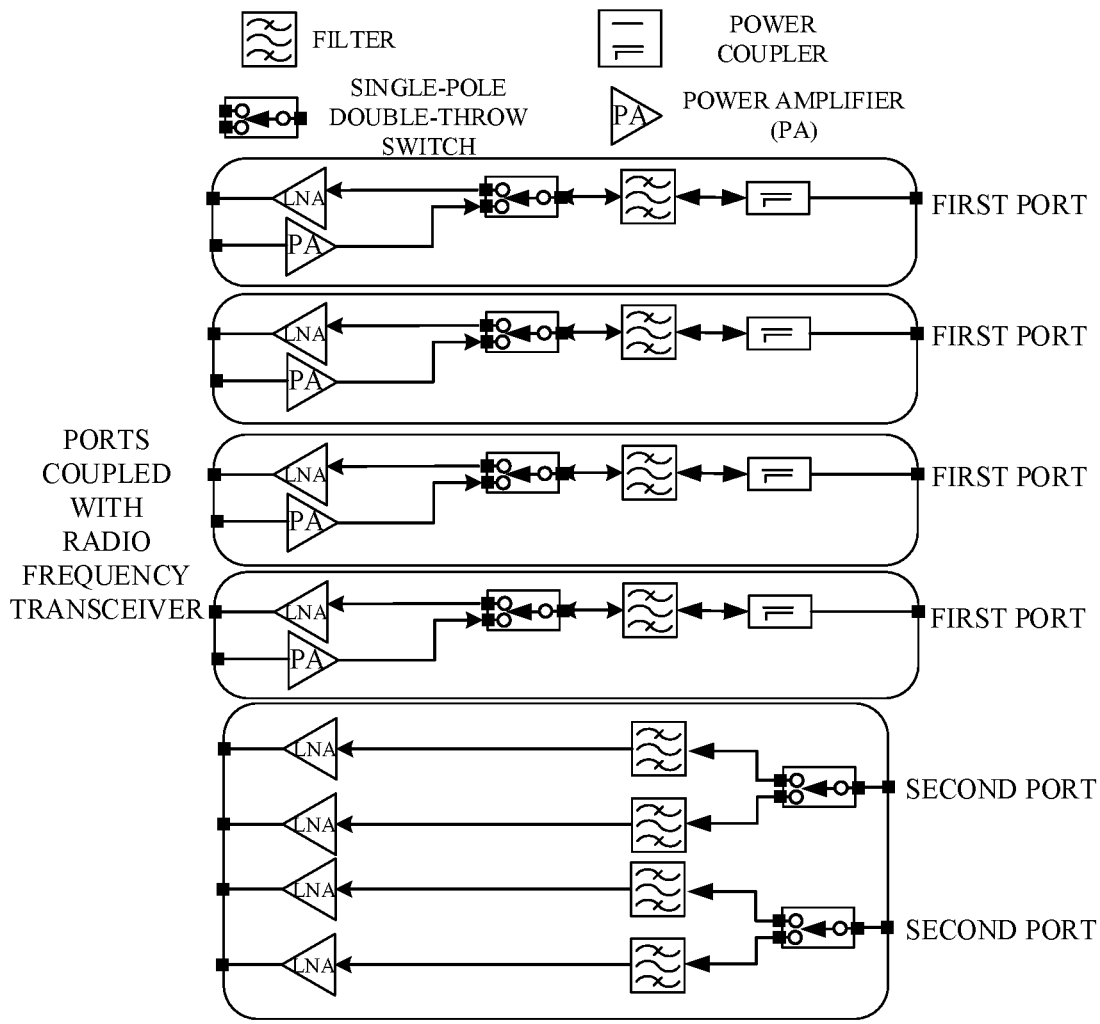
FIG. 15A is a schematic structural diagram illustrating still another radio frequency circuit of an electronic device according to an implementation of the disclosure.
Figure 15B:
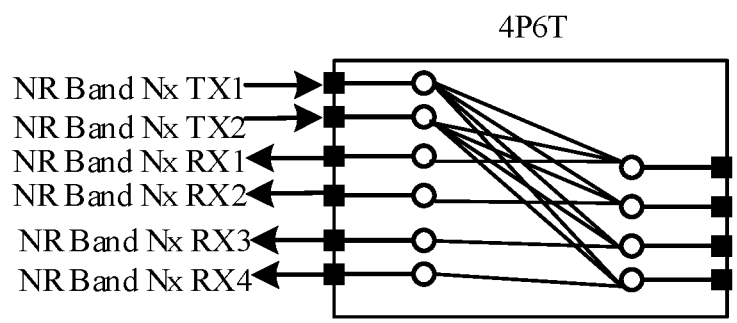
FIG. 15B is a schematic structural diagram illustrating still another multiway switch of an electronic device according to an implementation of the disclosure.

In the case that the electronic device is operable in the dual-frequency dual-transmit mode, the electronic device logically includes eight receiver circuits and four transmitter circuits. Since n=6 and m=4, the number of MOS transistors corresponding to the multiway switch is 6+(4*4+(6−4)*1)*3+4=64. The four transmitter circuits correspond to (in one-to-one correspondence with) four first ports, and each first port is coupled with one first T port of the multiway switch. In addition, four of the eight receiver circuits can respectively be integrated with the four transmitter circuits to be coupled with the four first ports; one transmitter circuit and one receiver circuit that correspond to the same first port are at the same frequency band. The remaining four receiver circuits are divided into two groups. Each group includes two receiver circuits at different frequency bands and corresponds to one second port, and each second port is coupled with a corresponding second T port of the multiway switch. In this case, a schematic structure of a corresponding radio frequency circuit is illustrated in FIG. 15A and a schematic structure of a corresponding multiway switch is illustrated in FIG. 15B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

It can be seen that for the case where n=6 and m=2, 3, 4, or 5, the multiway switch of the implementation of the disclosure can enable the electronic device to be operable in the single-frequency dual-transmit mode, the dual-frequency single-transmit mode, or the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

As can be seen, for the transmit paths and the receive paths of the radio frequency system of the electronic device, the transmit paths can include one single independent switch (a 4P6T switch) or two independent switches (a SPDT switch and a 4P6T switch), and the receive paths can include one single independent switch (a 4P6T switch) or two independent switches (a SPDT switch and a 4P6T switch). That is to say, by integrating more switch functions of the transmit paths and the receive paths of the radio frequency system into the 4P6T switch, the number of independent switches of the transmit paths and the receive paths can be effectively reduced.

In one possible implementation, n=7 and m=1 (that is, the multiway switch includes seven T ports and one first T port). The electronic device is operable in the dual-frequency single-transmit mode.

Figure 16A:
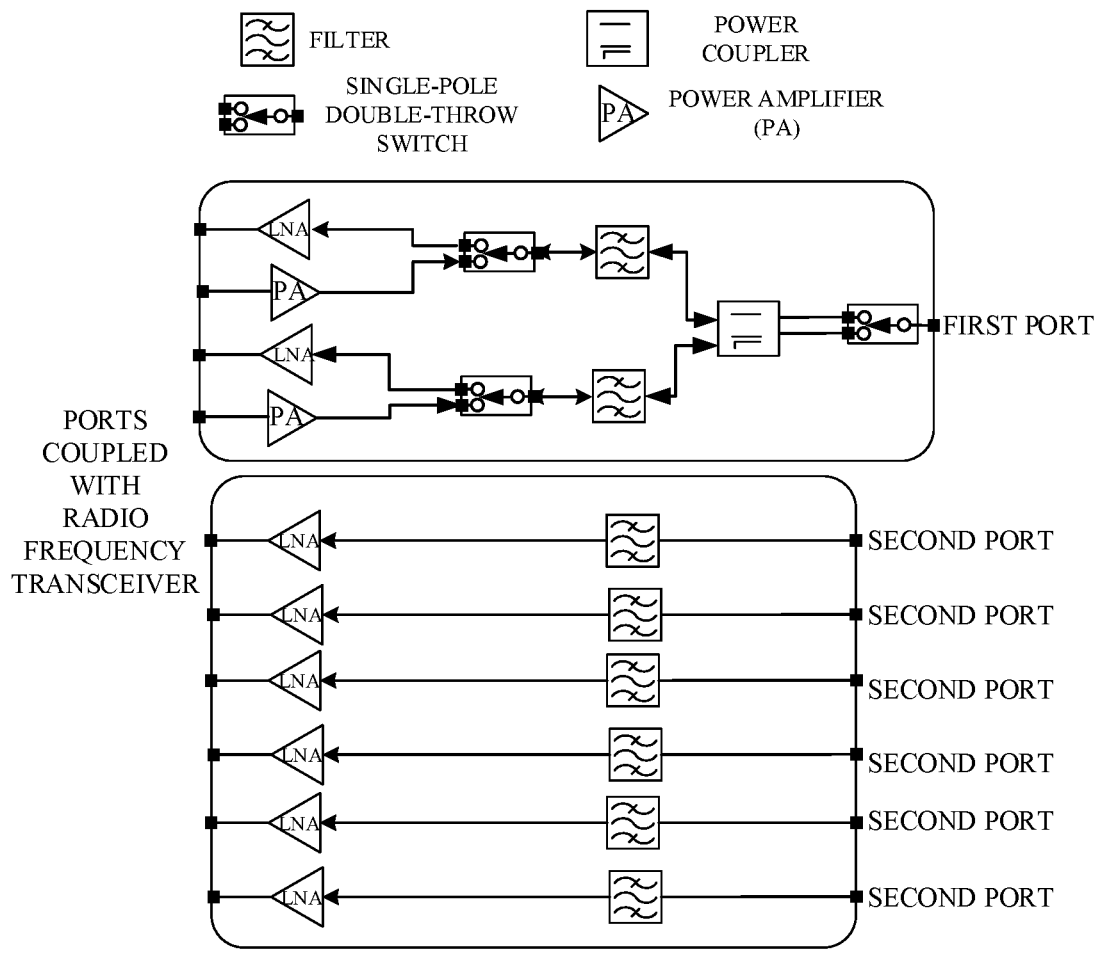
FIG. 16A is a schematic structural diagram illustrating still another radio frequency circuit of an electronic device according to an implementation of the disclosure.
Figure 16B:
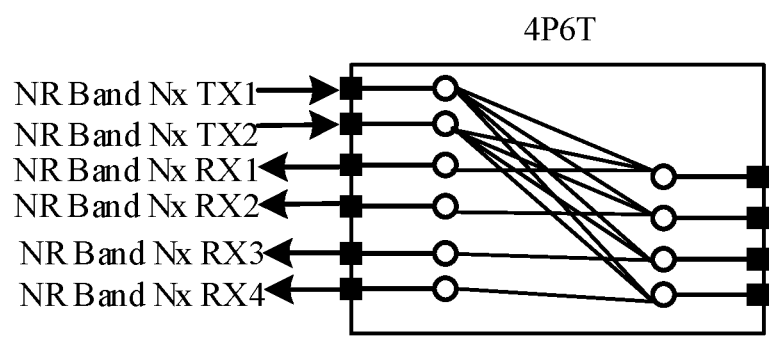
FIG. 16B is a schematic structural diagram illustrating still another multiway switch of an electronic device according to an implementation of the disclosure.

In the case that the electronic device is operable in the dual-frequency single-transmit mode, the electronic device logically includes eight receiver circuits and two transmitter circuits. Since n=7 and m=1, the number of MOS transistors corresponding to the multiway switch is 7+(1*4+(7−1)*1)*3+4=41. The two transmitter circuits are integrated to be coupled with a same first port, and the first port is coupled with one first T port of the multiway switch. In addition, two of the eight receiver circuits can respectively be integrated with the two transmitter circuits to be coupled with the above first port; the remaining six receiver circuits correspond to (in a one-to-one correspondence relation with) six second ports, where each second port is coupled with a corresponding second T port of the multiway switch. In this case, a schematic structure of a corresponding radio frequency circuit is illustrated in FIG. 16A and a schematic structure of a corresponding multiway switch is illustrated in FIG. 16B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

It can be seen that for the case where n=7 and m=1, the multiway switch of the implementation of the disclosure can enable the electronic device to be operable in the dual-frequency single-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

In one possible implementation, n=7, m is an integer and 2≤m≤6 (that is, the multiway switch includes seven T ports and two, three, four, five, or six first T ports). The electronic device is operable in at least one mode of: the dual-frequency single-transmit mode and the dual-frequency dual-transmit mode.

It can be seen that for the case where n=7 and m=2, 3, 4, 5, or 6, the multiway switch of the implementation of the disclosure can enable the electronic device to be operable in the dual-frequency single-transmit mode and the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

As can be seen, for the transmit paths and the receive paths of the radio frequency system of the electronic device, the transmit paths can include one single independent switch (a 4P7T switch) or two independent switches (a SPDT switch and a 4P7T switch), and the receive paths can include one single independent switch (a 4P7T switch) or two independent switches (a SPDT switch and a 4P7T switch). That is to say, by integrating more switch functions of the transmit paths and the receive paths of the radio frequency system into the 4P7T switch, the number of independent switches of the transmit paths and the receive paths can be effectively reduced.

In one possible implementation, n=8 and m=1 (that is, the multiway switch includes eight T ports and one first T port). The electronic device is operable in the dual-frequency single-transmit mode.

It can be seen that for the case where n=8 and m=1, the multiway switch of the implementation of the disclosure can enable the electronic device to be operable in the dual-frequency single-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

In one possible implementation, n=8, m is an integer and 2≤m≤7 (that is, the multiway switch includes eight T ports and two, three, four, five, six, or seven first T ports). The electronic device is operable in at least one mode of: the dual-frequency single-transmit mode and the dual-frequency dual-transmit mode.

Figure 17A:
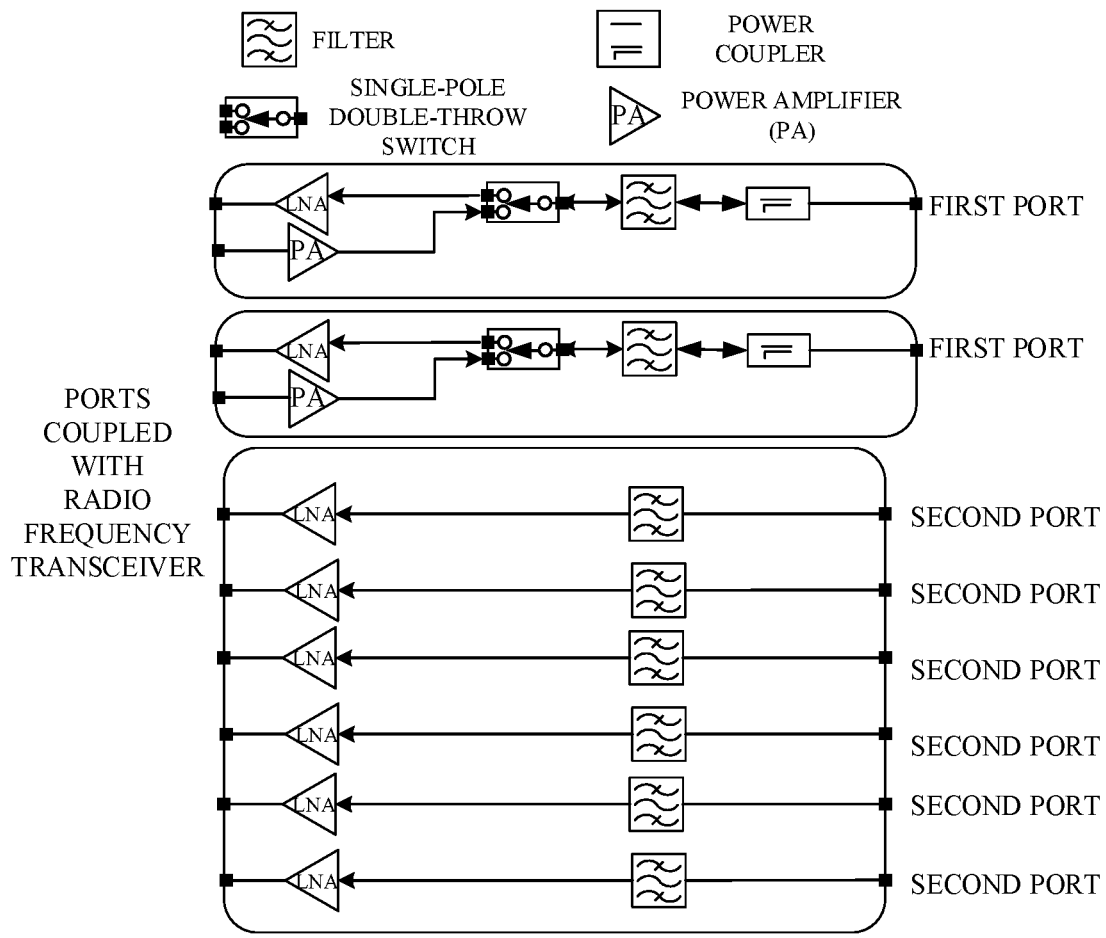
FIG. 17A is a schematic structural diagram illustrating still another radio frequency circuit of an electronic device according to an implementation of the disclosure.
Figure 17B:
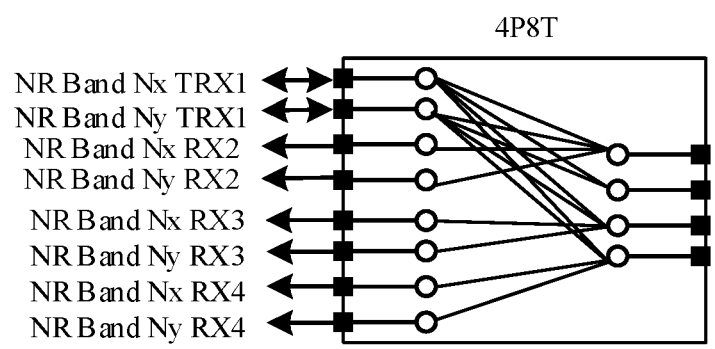
FIG. 17B is a schematic structural diagram illustrating still another multiway switch of an electronic device according to an implementation of the disclosure.

In the case that the electronic device is operable in the dual-frequency single-transmit mode, the electronic device logically includes eight receiver circuits and two transmitter circuits. Since n=8 and m=2, the number of MOS transistors corresponding to the multiway switch is 8+(2*4+(8−2)*1)*3+4=54. The two transmitter circuits correspond to (in one-to-one correspondence with) two first ports, and each first port is coupled with one first T port of the multiway switch. In addition, among the eight receiver circuits and the two transmitter circuits, one receiver circuit and one transmitter circuit can be integrated to be coupled with a corresponding first port, and another receiver circuit and the other transmitter circuit can be integrated to be coupled with another corresponding first port; the remaining six receiver circuits correspond to six second ports (in one-to-one correspondence), where each second port is coupled with a corresponding second T port of the multiway switch. In this case, a schematic structure of a corresponding radio frequency circuit is illustrated in FIG. 17A and a schematic structure of a corresponding multiway switch is illustrated in FIG. 17B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

Figure 18A:
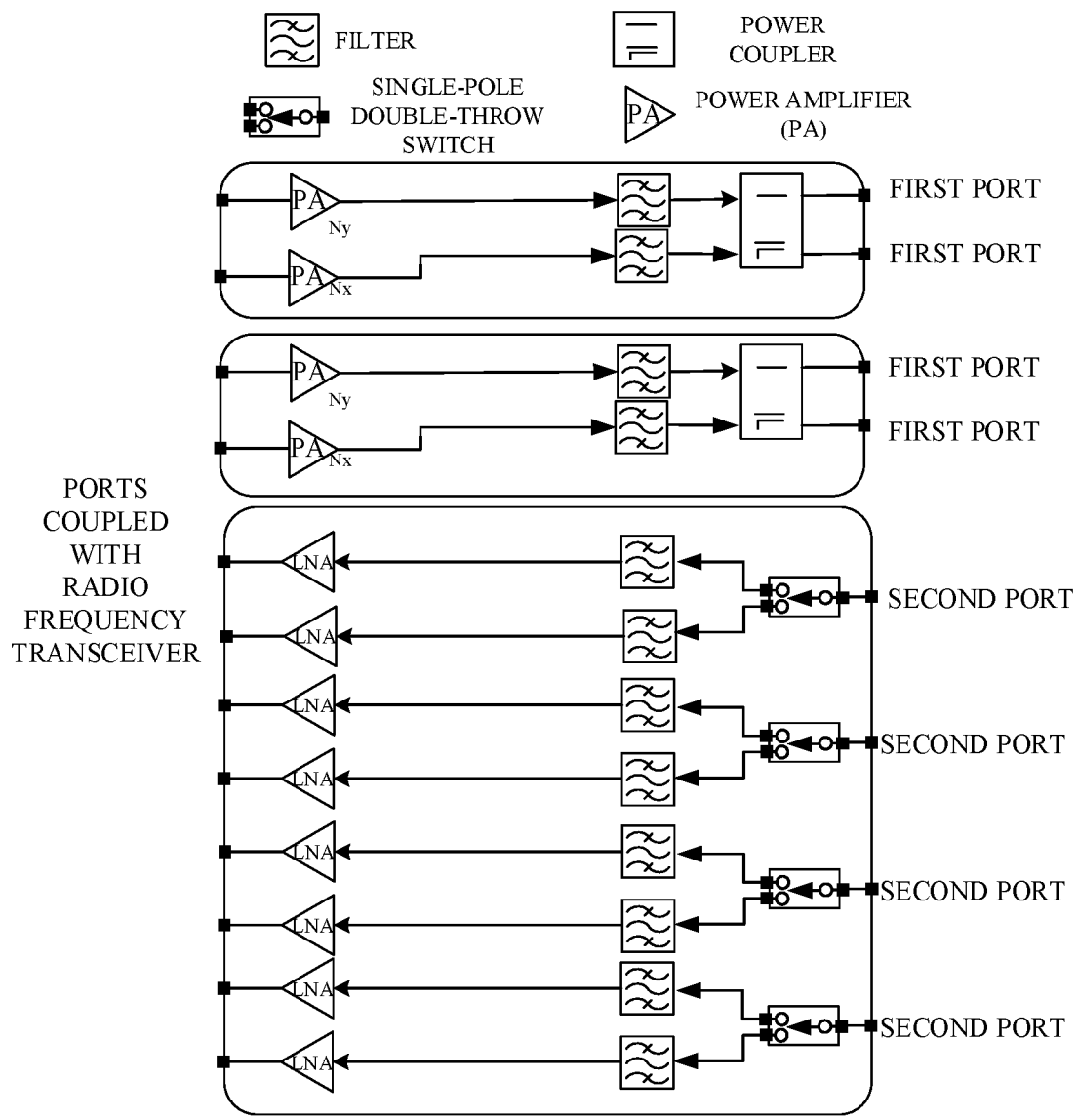
FIG. 18A is a schematic structural diagram illustrating still another radio frequency circuit of an electronic device according to an implementation of the disclosure.
Figure 18B:
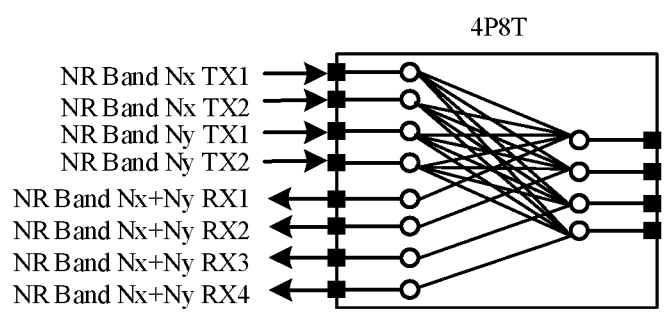
FIG. 18B is a schematic structural diagram illustrating still another multiway switch of an electronic device according to an implementation of the disclosure.

In the case that the electronic device is operable in the dual-frequency dual-transmit mode, the electronic device logically includes eight receiver circuits and four transmitter circuits. Since n=8 and m=4, the number of MOS transistors corresponding to the multiway switch is 8+(4*4+(8−4)*1)*3+4=72. The four transmitter circuits correspond to four first ports (in one-to-one correspondence), and each first port is coupled with a corresponding first T port of the multiway switch. In addition, the eight receiver circuits are divided into four groups. Each group includes two receiver circuits at different frequency bands and corresponds to one second port, and each second port is coupled with a corresponding second T port of the multiway switch. In this case, a schematic structure of a corresponding radio frequency circuit is illustrated in FIG. 18A and a schematic structure of a corresponding multiway switch is illustrated in FIG. 18B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

Figure 19A:
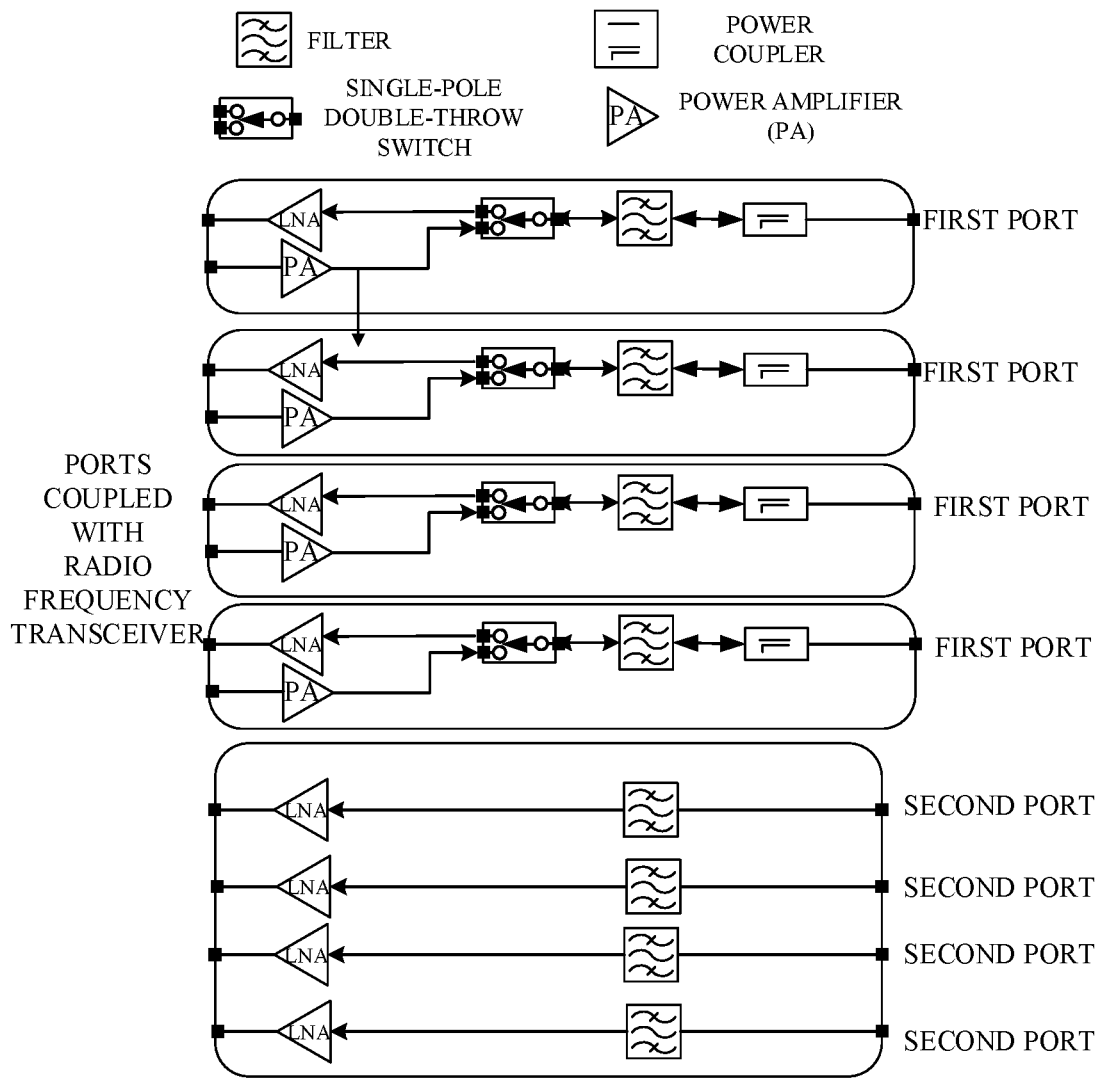
FIG. 19A is a schematic structural diagram illustrating still another radio frequency circuit of an electronic device according to an implementation of the disclosure.
Figure 19B:
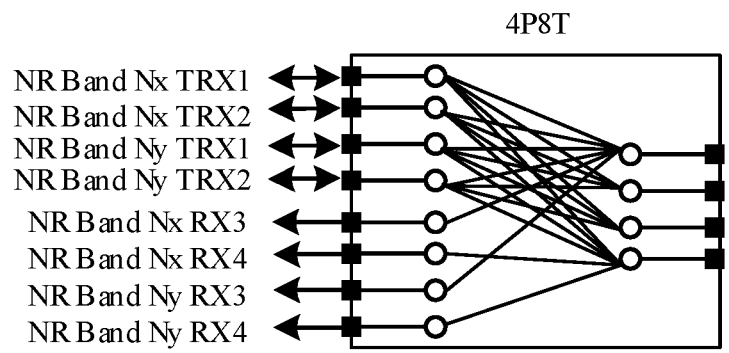
FIG. 19B is a schematic structural diagram illustrating still another multiway switch of an electronic device according to an implementation of the disclosure.

Alternatively, the four transmitter circuits correspond to four first ports (in one-to-one correspondence), and each first port is coupled with a corresponding first T port of the multiway switch. In addition, four of the eight receiver circuits can respectively be integrated with the four transmitter circuits to be coupled with the four first ports. The remaining four receiver circuits correspond to four second ports (in one-to-one correspondence), where each second port is coupled with a corresponding second T port of the multiway switch. In this case, a schematic structure of a corresponding radio frequency circuit is illustrated in FIG. 19A and a schematic structure of a corresponding multiway switch is illustrated in FIG. 19B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

It can be seen that for the case where n=8, m is an integer and 2≤m≤7, the multiway switch of the implementation of the disclosure can enable the electronic device to be operable in the dual-frequency single-transmit mode and the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

As can be seen, for the transmit paths and the receive paths of the radio frequency system of the electronic device, the transmit paths can include one single independent switch (a 4P8T switch) or two independent switches (a SPDT switch and a 4P8T switch), and the receive paths can include one single independent switch (a 4P8T switch) or two independent switches (a SPDT switch and a 4P8T switch). That is to say, by integrating more switch functions of the transmit paths and the receive paths of the radio frequency system into the 4P8T switch, the number of independent switches of the transmit paths and the receive paths can be effectively reduced.

In one possible implementation, n=9 and m=1 (that is, the multiway switch includes nine T ports and one first T port). The electronic device is operable in the dual-frequency single-transmit mode.

Figure 20A:
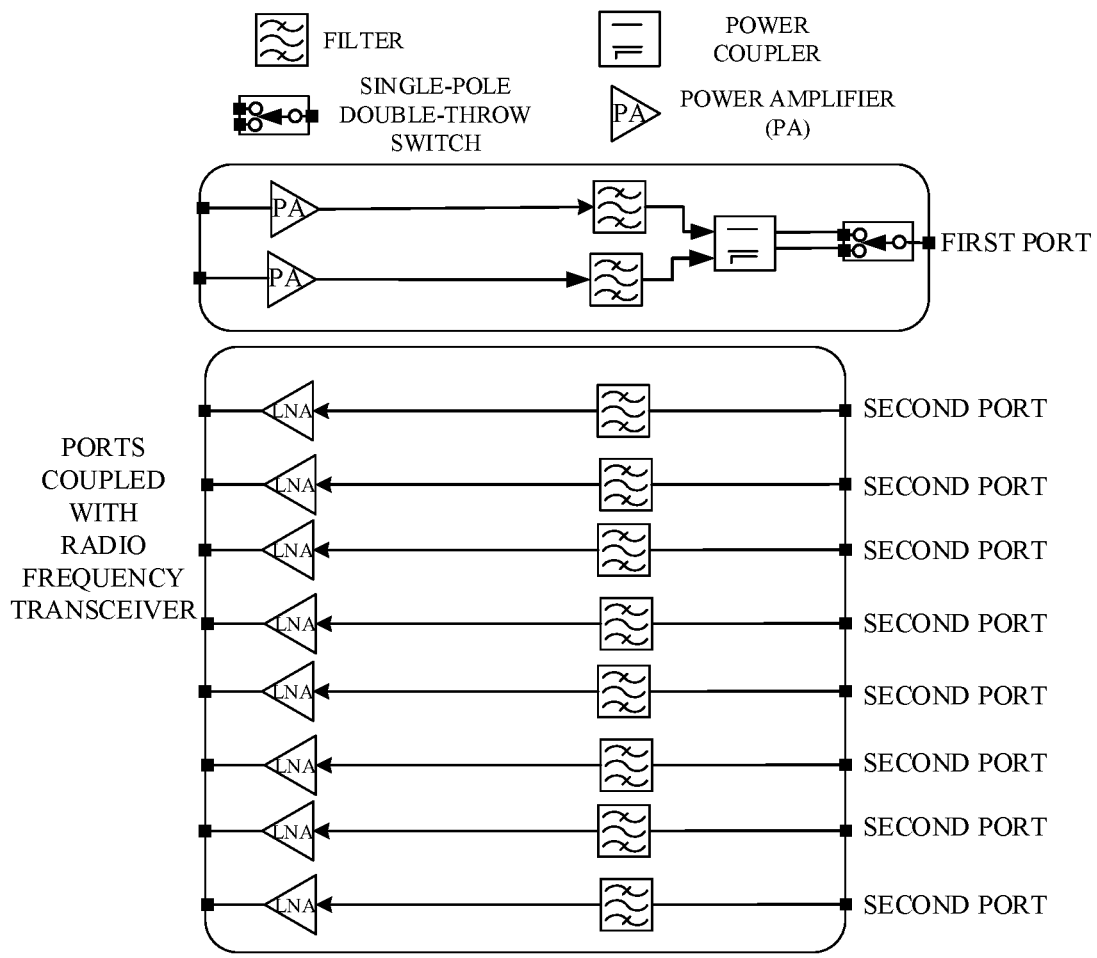
FIG. 20A is a schematic structural diagram illustrating still another radio frequency circuit of an electronic device according to an implementation of the disclosure.
Figure 20B:
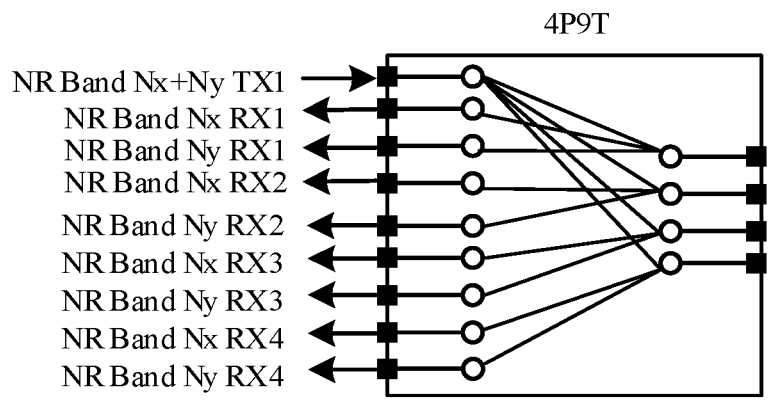
FIG. 20B is a schematic structural diagram illustrating still another multiway switch of an electronic device according to an implementation of the disclosure.

In the case that the electronic device is operable in the dual-frequency single-transmit mode, the electronic device logically includes eight receiver circuits and two transmitter circuits. Since n=9 and m=1, the number of MOS transistors corresponding to the multiway switch is 9+(1*4+(9−1)*1)*3+4=49. The two transmitter circuits are integrated to be coupled with a first port, and the first port is coupled with a corresponding first T port of the multiway switch. In addition, the eight receiver circuits correspond to eight second ports (in one-to-one correspondence), where each second port is coupled with a corresponding second T port of the multiway switch. In this case, a schematic structure of a corresponding radio frequency circuit is illustrated in FIG. 20A and a schematic structure of a corresponding multiway switch is illustrated in FIG. 20B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

It can be seen that for the case where n=9 and m=1, the multiway switch of the implementation of the disclosure can enable the electronic device to be operable in the dual-frequency single-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

In one possible implementation, n=9, m is an integer and $2 \le m \le 8$ (that is, the multiway switch includes nine T ports and two, three, four, five, six, seven, or eight first T ports). The electronic device is operable in at least one mode of: the dual-frequency single-transmit mode and the dual-frequency dual-transmit mode.

It can be seen that for the case where n=9, m is an integer and $2 \le m \le 8$, the multiway switch of the implementation of the disclosure can enable the electronic device to be operable in the dual-frequency single-transmit mode and the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

As can be seen, for the transmit paths and the receive paths of the radio frequency system of the electronic device, the transmit paths can include one single independent switch (a 4P9T switch) or two independent switches (a SPDT switch and a 4P9T switch) and the receive paths can include one single independent switch (a 4P9T switch) or two independent switches (a SPDT switch and a 4P9T switch). That is to say, by integrating more switch functions of the transmit paths and the receive paths of the radio frequency system into the 4P9T switch, the number of independent switches of the transmit paths and the receive paths can be effectively reduced.

In one possible implementation, n=10, m is an integer and $2 \le m \le 9$ (that is, the multiway switch includes ten T ports and two, three, four, five, six, seven, eight, or nine first T ports). The electronic device is operable in at least one mode of: the dual-frequency single-transmit mode and the dual-frequency dual-transmit mode.

Figure 21A:
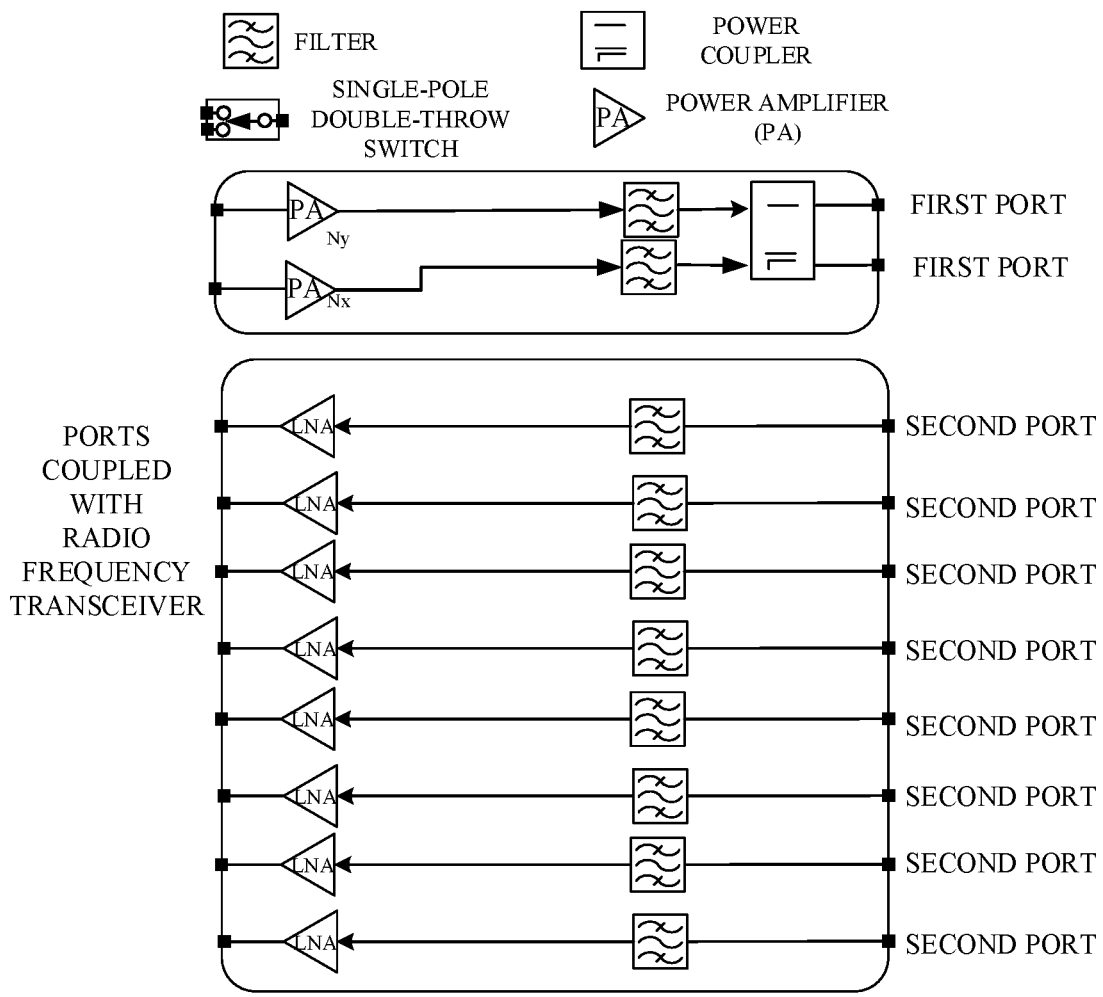
FIG. 21A is a schematic structural diagram illustrating still another radio frequency circuit of an electronic device according to an implementation of the disclosure.
Figure 21B:
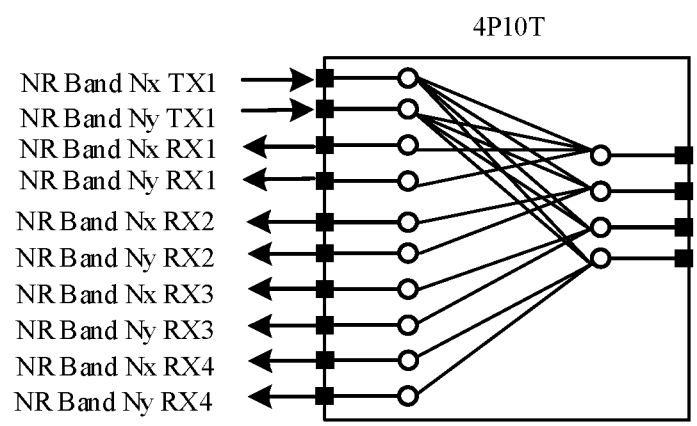
FIG. 21B is a schematic structural diagram illustrating still another multiway switch of an electronic device according to an implementation of the disclosure.

In the case that the electronic device is operable in the dual-frequency single-transmit mode, the electronic device logically includes eight receiver circuits and two transmitter circuits. Since n=10 and m=2, the number of MOS transistors corresponding to the multiway switch is 10+(2*4+(10−2)*1)*3+4=49. The two transmitter circuits correspond to two first ports (in one-to-one correspondence), and each first port is coupled with a corresponding first T port of the multiway switch. In addition, the eight receiver circuits correspond to eight second ports (in one-to-one correspondence), and each second port is coupled with a corresponding second T port of the multiway switch. In this case, a schematic structure of a corresponding radio frequency circuit is illustrated in FIG. 21A and a schematic structure of a corresponding multiway switch is illustrated in FIG. 21B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

Figure 22A:
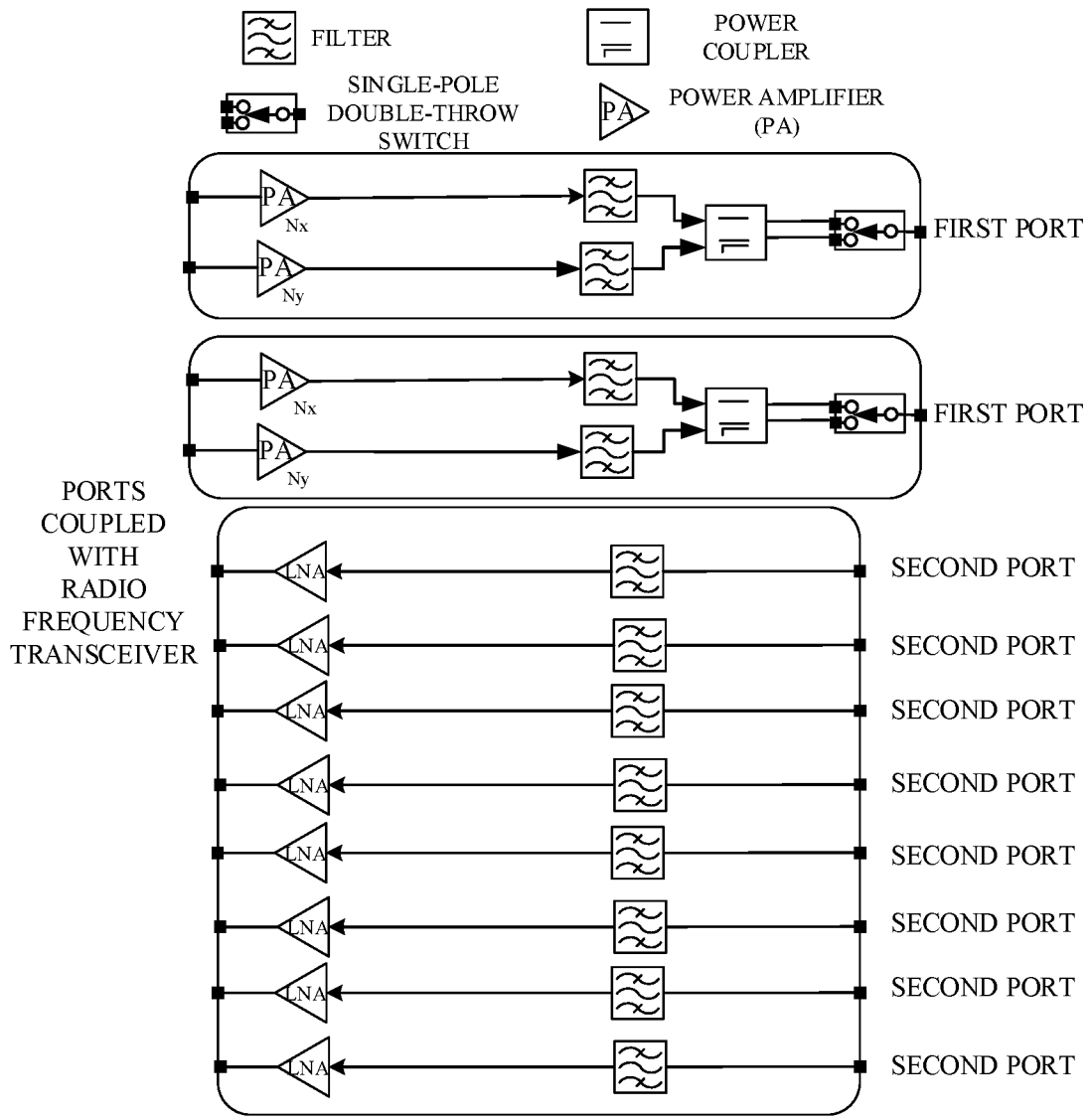
FIG. 22A is a schematic structural diagram illustrating still another radio frequency circuit of an electronic device according to an implementation of the disclosure.
Figure 22B:
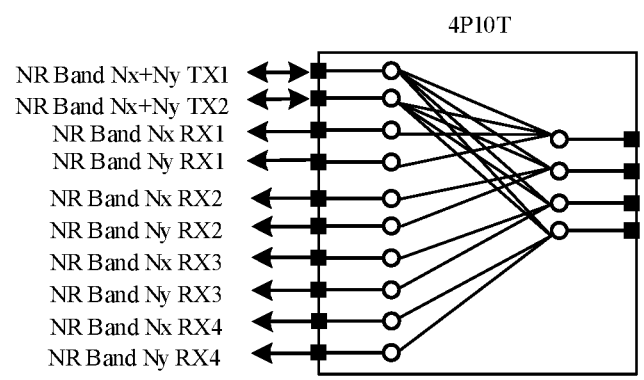
FIG. 22B is a schematic structural diagram illustrating still another multiway switch of an electronic device according to an implementation of the disclosure.

In the case that the electronic device is operable in the dual-frequency dual-transmit mode, the electronic device logically includes eight receiver circuits and four transmitter circuits. Since n=10 and m=2, the number of MOS transistors corresponding to the multiway switch is 10+(2*4+(10−2)*1)*3+4=49. The four transmitter circuits are divided into two groups, where each group includes two transmitter circuits at different frequency bands and corresponds to one first port, and each first port is coupled with a corresponding first T port of the multiway switch. In addition, the eight receiver circuits correspond to eight second ports (in one-to-one correspondence), and each second port is coupled with a corresponding second T port of the multiway switch. In this case, a schematic structure of a corresponding radio frequency circuit is illustrated in FIG. 22A, and a schematic structure of a corresponding multiway switch is illustrated in FIG. 22B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

It can be seen that for the case where n=10, m is an integer and $2 \le m \le 9$, the multiway switch of the implementation of the disclosure can enable the electronic device to be operable in the dual-frequency single-transmit mode and the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

As can be seen, for the transmit paths and the receive paths of the radio frequency system of the electronic device, the transmit paths can include one single independent switch (a 4P10T switch) or two independent switches (a SPDT switch and a 4P10T switch), and the receive paths can include one single independent switch (a 4P10T switch) or two independent switches (a SPDT switch and a 4P10T switch). That is to say, by integrating more switch functions of the transmit paths and the receive paths of the radio frequency system into the 4P10T switch, the number of independent switches of the transmit paths and the receive paths can be effectively reduced.

In one possible implementation, n=11, m is an integer and $3 \le m \le 10$ (that is, the multiway switch includes eleven T ports and three, four, five, six, seven, eight, nine, or ten first T ports). The electronic device is operable in the dual-frequency dual-transmit mode.

It can be seen that for the case where n=11 and m=3, 4, 5, 6, 7, 8, 9, or 10, the multiway switch of the implementation of the disclosure can enable the electronic device to be operable in the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

As can be seen, for the transmit paths and the receive paths of the radio frequency system of the electronic device, the transmit paths can include one single independent switch (a 4P11T switch) or two independent switches (a SPDT switch and a 4P11T switch), and the receive paths can include one single independent switch (a 4P11T switch) or two independent switches (a SPDT switch and a 4P11T switch). That is to say, by integrating more switch functions of the transmit paths and the receive paths of the radio frequency system into the 4P11T switch, the number of independent switches of the transmit paths and the receive paths can be effectively reduced.

In one possible implementation, n=12, m is an integer and $4 \leq m \leq 11$ (that is, the multiway switch includes twelve T ports and four, five, six, seven, eight, nine, ten, or eleven first T ports). The electronic device is operable in the dual-frequency dual-transmit mode.

Figure 23A:
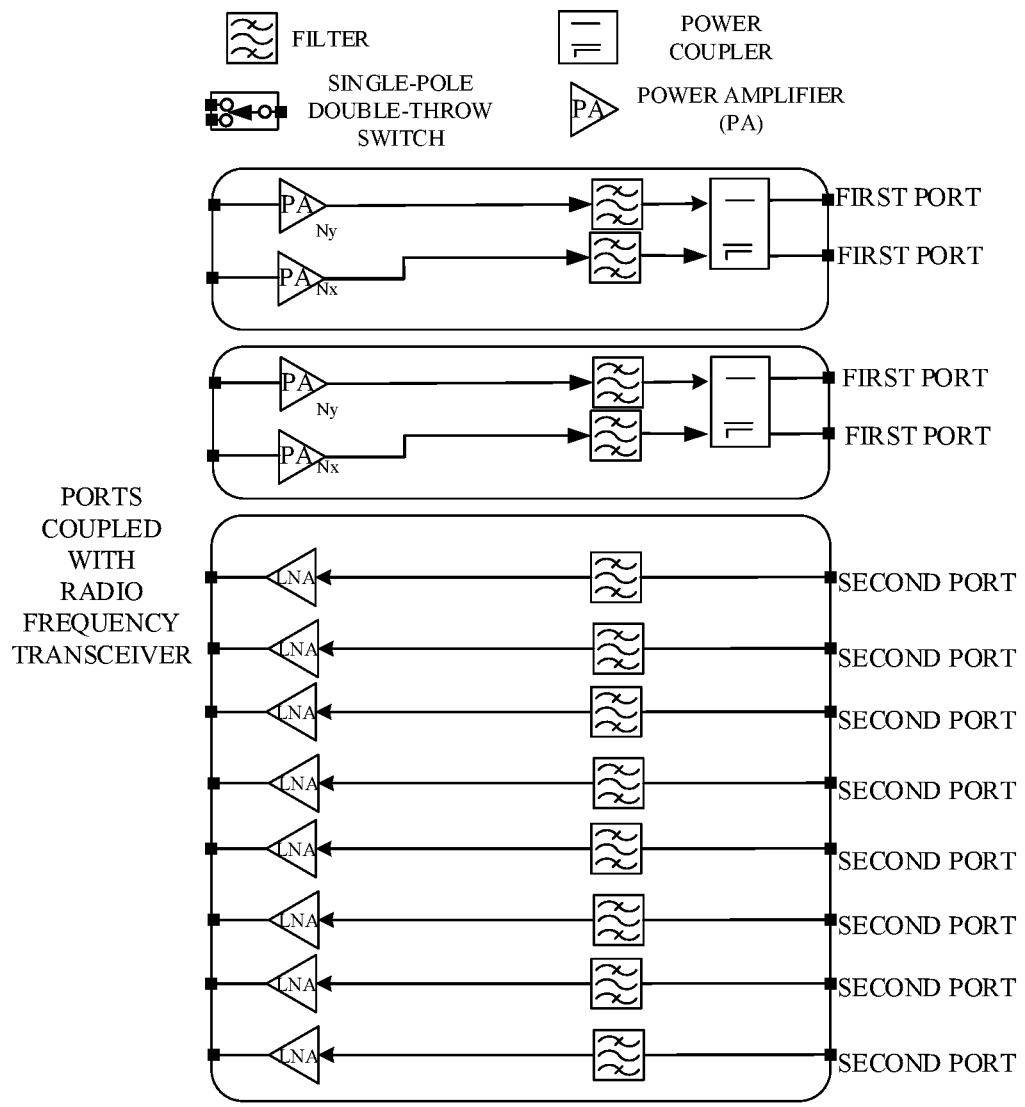
FIG. 23A is a schematic structural diagram illustrating still another radio frequency circuit of an electronic device according to an implementation of the disclosure.
Figure 23B:
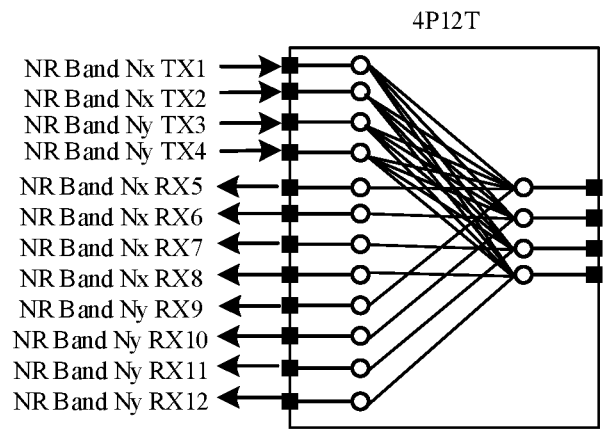
FIG. 23B is a schematic structural diagram illustrating still another multiway switch of an electronic device according to an implementation of the disclosure.

In the case that the electronic device is operable in the dual-frequency dual-transmit mode, the electronic device logically includes eight receiver circuits and four transmitter circuits. Since n=12 and m=4, the number of MOS transistors corresponding to the multiway switch is 10+(2*4+(10−2)*1)*3+4=49. The four transmitter circuits correspond to four first ports (in one-to-one correspondence), and each first port is coupled with a corresponding first T port of the multiway switch. In addition, the eight receiver circuits correspond to eight second ports (in one-to-one correspondence), and each second port is coupled with a corresponding second T port of the multiway switch. In this case, a schematic structure of a corresponding radio frequency circuit is illustrated in FIG. 23A, and a schematic structure of a corresponding multiway switch is illustrated in FIG. 23B. The specific configuration of the transmitter circuit and the receiver circuit, and definitions related to the multiway switch are similar to the foregoing implementations and will not be described herein again. In addition, it can be understood that, the matching manner of the above radio frequency circuit and the multiway switch includes but is not limited to the structure of the drawing, and is merely an example herein.

It can be seen that for the case where n=12 and m=4, 5, 6, 7, 8, 9, 10, or 11, the multiway switch of the implementation of the disclosure can enable the electronic device to be operable in the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

As can be seen, for the transmit paths and the receive paths of the radio frequency system of the electronic device, the transmit paths can include one single independent switch (a 4P12T switch), and the receive paths can include one single independent switch (a 4P12T switch). That is to say, by integrating more switch functions of the transmit paths and the receive paths of the radio frequency system into the 4P12T switch, the number of independent switches of the transmit paths and the receive paths can be effectively reduced.

It can be understood that, the above-mentioned receiver circuits and transmitter circuits can be implemented in various manners. The implementations of the disclosure are not particularly restricted.

In one possible implementation, the radio frequency circuit of the electronic device operable in the single-frequency single-transmit mode logically includes one transmitter circuit and four receiver circuits. The radio frequency circuit physically includes at least one independent circuit module. The at least one independent circuit module has at least one of a transmit-receive port (also known as a signal transmit-receive port) and a transmit port (also known as a signal transmit port) which are configured to be coupled with the first T ports. The at least one independent circuit module has receive ports (also known as signal receive ports) configured to be coupled with the second T ports or the first T ports.

The transmit-receive port of the independent circuit module corresponds to a port of a transceiver circuit.

Any two transmit-receive ports and/or transmit ports of the independent circuit module are coupled with different first T ports, and any two receive ports are coupled with different second T ports.

It can be understood that, in this implementation, the radio frequency circuit can be embodied in a variety of physical forms, which are not limited herein.

In this implementation, for the electronic device operable in the single-frequency single-transmit mode, the radio frequency circuit adapted to the multiway switch physically includes at least one independent circuit module, which is beneficial to improving flexibility of adaptation and reducing the cost.

In one possible implementation, the radio frequency circuit of the electronic device operable in the single-frequency dual-transmit mode logically includes two transmitter circuits and four receiver circuits. The radio frequency circuit physically includes at least two independent circuit modules. The at least two independent circuit modules have at least one of a transmit-receive port and a transmit port which are configured to be coupled with the first T ports. Specifically, the at least two independent circuit modules may have one or more transmit-receive ports. In addition, or alternatively, the at least two independent circuit modules may have one or more transmit ports. The at least two independent circuit modules have receive ports configured to be coupled with the second T ports or the first T ports. The "transmit-receive port", "transmit port", or "receive port" refers to a port (may be composed of one or more components) which implements a corresponding transmission and/or reception function and is located on the path after integration of one or more transmitter circuits and/or one or more receiver circuits, on the path of a transmitter circuit, or on the path of a receiver circuit. It should be noted that the ports such as transmit ports, receive ports, and transmit-receive ports illustrated in the figures are exemplary and do not intent to indicate an exact port position and impose any restrictions.

Since low-noise amplifiers (LNA) in the receiver circuits can operate simultaneously, due to their low power and low power consumption, mutual influence can be avoided through design. Therefore, multiple LNAs in multiple receiver circuits at the same frequency band can exist in the same circuit module.

As can be seen, in this example, when two PAs at the same frequency band work simultaneously (corresponding to UL MIMO mode), a transmit power will be high, and two signals will interfere with each other. In addition, the two PAs will affect heat dissipation efficiency when working at the same time. Considering this, two independent circuit modules are needed to set PAs in the transmitter circuits, which is beneficial to reducing interference and improving signal processing efficiency and heat dissipation efficiency of the radio frequency system.

In one possible implementation, the radio frequency circuit of the electronic device operable in the dual-frequency single-transmit mode logically includes two transmitter circuits and eight receiver circuits. The radio frequency circuit physically includes at least one independent circuit module. The at least one independent circuit module has at least one of a transmit-receive port and a transmit port which are configured to be coupled with the first T ports. The at least one independent circuit module has receive ports configured to be coupled with the second T ports or the first T ports.

Since PAs in the transmitter circuits at different frequency bands do not work at the same time, two PAs at different frequency bands can be provided in the same independent circuit module.

In this implementation, for the electronic device operable in the dual-frequency single-transmit mode, the radio frequency circuit adapted to the multiway switch physically includes at least one independent circuit module, which is beneficial to improving flexibility of adaptation and reducing the cost.

In one possible implementation, the radio frequency circuit of the electronic device operable in the dual-frequency dual-transmit mode logically includes four transmitter circuits and eight receiver circuits. The radio frequency circuit physically includes at least two independent circuit modules. When there is an independent circuit module including two power amplifiers (PA) of the at least two independent circuit modules, the two PAs of the independent circuit module are operable at different frequency bands. The at least two independent circuit modules have at least one of a transmit-receive port and a transmit port which are configured to be coupled with the first T ports. The at least two independent circuit modules have receive port configured to be coupled with the second T ports or the first T ports.

As can be seen, in this example, since two PAs at the same frequency band can work simultaneously (corresponding to UL MIMO mode), a transmit power will be high, and two signals will interfere with each other. In addition, the two PAs will affect heat dissipation efficiency when working at the same time. Therefore, two independent circuit modules are needed to set PAs in the transmitter circuits. At the same time, since PAs at different frequency bands in the transmitter circuits do not work at the same time, two PAs at different frequency bands can be provided in the same independent circuit module. It is beneficial to reducing interference and improving signal processing efficiency and heat dissipation efficiency of the radio frequency system.

In one possible implementation, the four antennas include a first antenna, a second antenna, a third antenna, and a fourth antenna. These four antennas are all operable at a fifth generation new radio (5G NR) frequency band.

The 5G NR frequency band may include, for example, 3.3 GHz to 3.8 GHz and 4.4 GHz to 5 GHz.

In one possible implementation, the four antennas include a first antenna, a second antenna, a third antenna, and a fourth antenna. The first antenna and the fourth antenna are antennas operable at a long term evolution (LTE) frequency band and a fifth generation new radio (5G NR) frequency band. The second antenna and the third antenna are antennas only operable at the 5G NR frequency band.

The first antenna and fourth antenna are intended to support DL 4×4 MIMO for some frequency bands in LTE on terminals. These two antennas are shared with the 5G NR (hereinafter, "shared antennas" for short). The LTE frequency band may include, for example, 1880-1920 MHz and 2496-2690 MHz.

Figure 24:
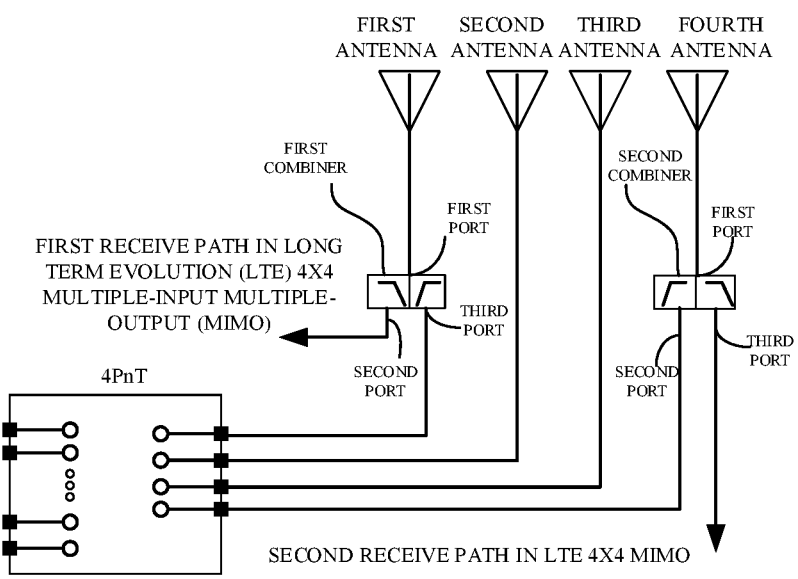
FIG. 24 is a schematic structural diagram illustrating an antenna system of an electronic device according to an implementation of the disclosure.

In one possible implementation, as illustrated in FIG. 24, the antenna system further includes a first combiner and a second combiner. The first combiner has a first port configured to be coupled with the first antenna, a second port configured to be coupled with a first receive path in LTE 4×4 multiple-input multiple-output (MIMO) configuration of the electronic device, and a third port configured to be coupled with a corresponding P port of the multiway switch. The second combiner has a first port configured to be coupled with the fourth antenna, a second port configured to be coupled with a second receive path in the LTE 4×4 MIMO configuration of the electronic device, and a third port configured to be coupled with a corresponding P port of the multiway switch.

The LTE 4*4 MIMO is a downlink LTE receive circuit and can be defined as a third receive path. Since the LTE currently has two receive paths, in order to support LTE 4×4 MIMO, the third path and a fourth receive path are added.

According to performance of the four antennas, the electronic device will arrange one antenna with better performance for the circuit for PRX (primary receiver), and the antenna will in a standby state. Moreover, first T ports in the switch having both the transmission function and the reception function can be configured for TX (transmit) and PRX purpose, and thus the antenna can be switched arbitrarily. In this way, there is no need to restrict the coupling between ports of shared antennas.

Figure 25:
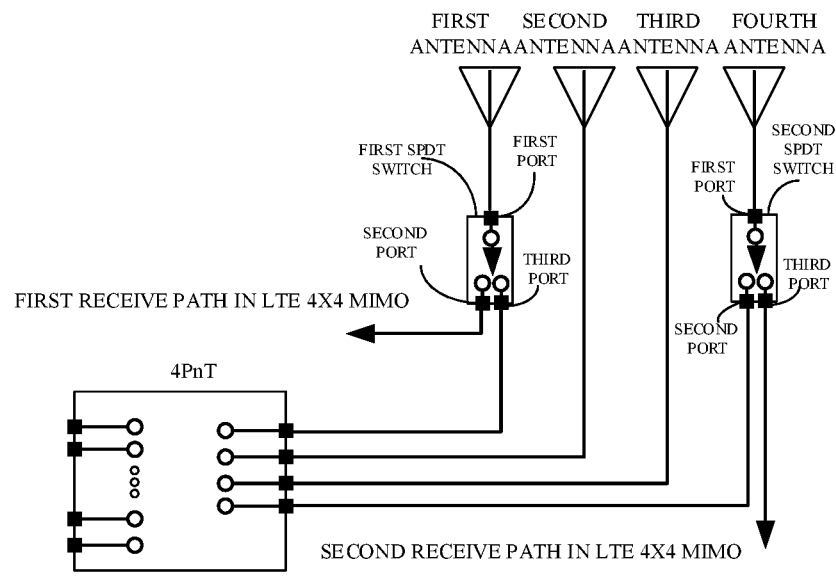
FIG. 25 is a schematic structural diagram illustrating another antenna system of an electronic device according to an implementation of the disclosure.

In one possible implementation, as illustrated in FIG. 25, the antenna system further includes a first single-pole double-throw (SPDT) switch and a second SPDT switch. The first SPDT switch has a first port configured to be coupled with the first antenna, a second port configured to be coupled with a first receive path in LTE 4×4 multiple-input multiple-output (MIMO) configuration of the electronic device, and a third port configured to be coupled with a corresponding P port of the multiway switch. The second SPDT switch has a first port configured to be coupled with the fourth antenna, a second port configured to be coupled with a second receive path in the LTE 4×4 MIMO configuration of the electronic device, and a third port configured to be coupled with a corresponding P port of the multiway switch.

Figure 26:
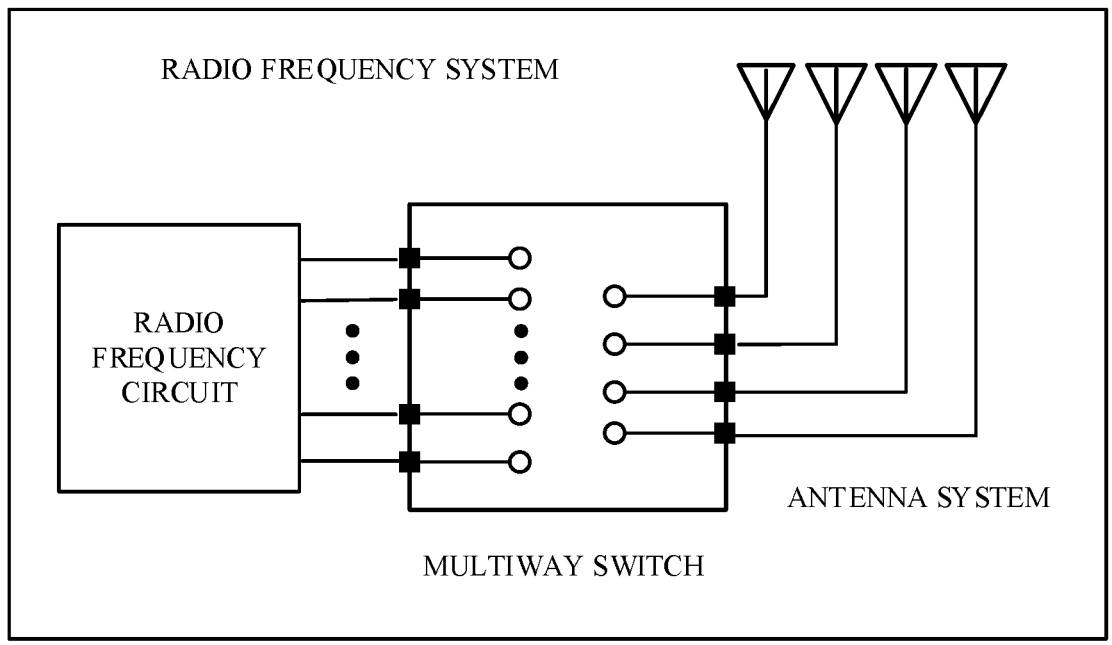
FIG. 26 is a schematic structural diagram illustrating a radio frequency system according to an implementation of the disclosure.

FIG. 26 is a schematic structural diagram illustrating a radio frequency system according to an implementation of the disclosure. The radio frequency system includes an antenna system, a radio frequency circuit, and the multiway switch according to any of the implementations above. The multiway switch has n T ports and four P ports, at least one of the n T ports is coupled with all of the four P ports, and n being an integer and 4≤n. The antenna system includes four antennas corresponding to the four P ports.

The multiway switch is configured to implement a preset function of the radio frequency system, and the preset function is transmitting an SRS through the four antennas corresponding to the four P ports in turn. The 4PnT configuration of the multiway switch can refer to the foregoing descriptions and will not be detailed again herein.

Each of the four P ports is coupled with a corresponding antenna of the four antennas. The n T ports includes m first T ports and (n−m) second T ports, the first T ports at least support a transmission function and the second T ports support only a reception function, 0<m≤11, and 4≤n≤12. Each first T port is coupled with all of the four P ports. Each second T port is coupled with one of the four P ports and any two second T ports at the same frequency band are coupled with different P ports.

Figure 27:
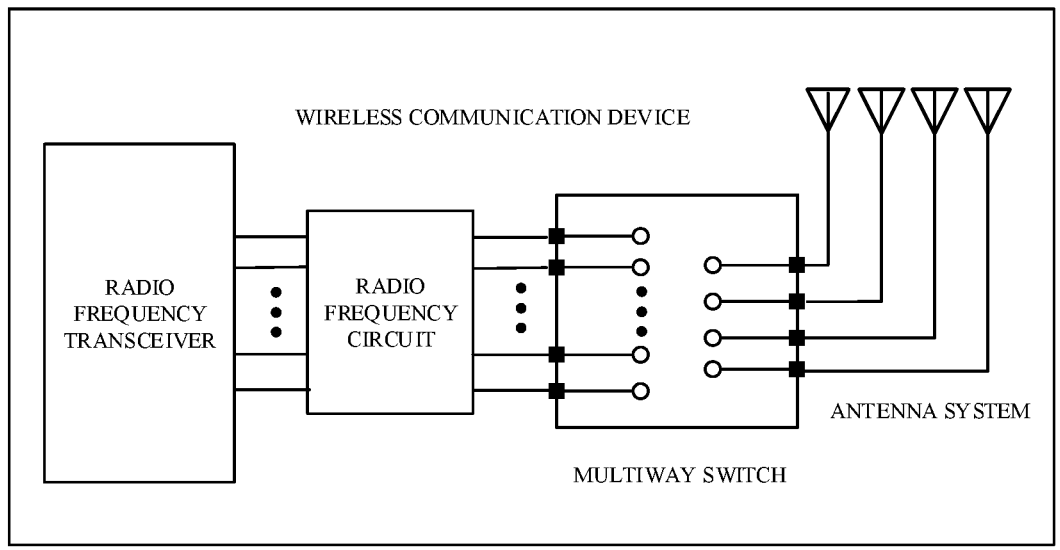
FIG. 27 is a schematic structural diagram illustrating a wireless communication device according to an implementation of the disclosure.

FIG. 27 is a schematic structural diagram illustrating a wireless communication device according to an implementation of the disclosure. The wireless communication device can be a terminal device, a base station, and the like, and includes an antenna system, a radio frequency transmitter, a radio frequency circuit coupled with the radio frequency transmitter, and the multiway switch described in any of the implementations above.

The multiway switch includes n T ports and four P ports, at least one of the n T ports is coupled with all of the four P ports, and n is an integer and 4≤n. The antenna system includes four antennas corresponding to the four P ports.

The multiway switch is coupled with the radio frequency circuit and the antenna system and supports a function of transmitting an SRS through the four antennas in turn.

Figure 28:
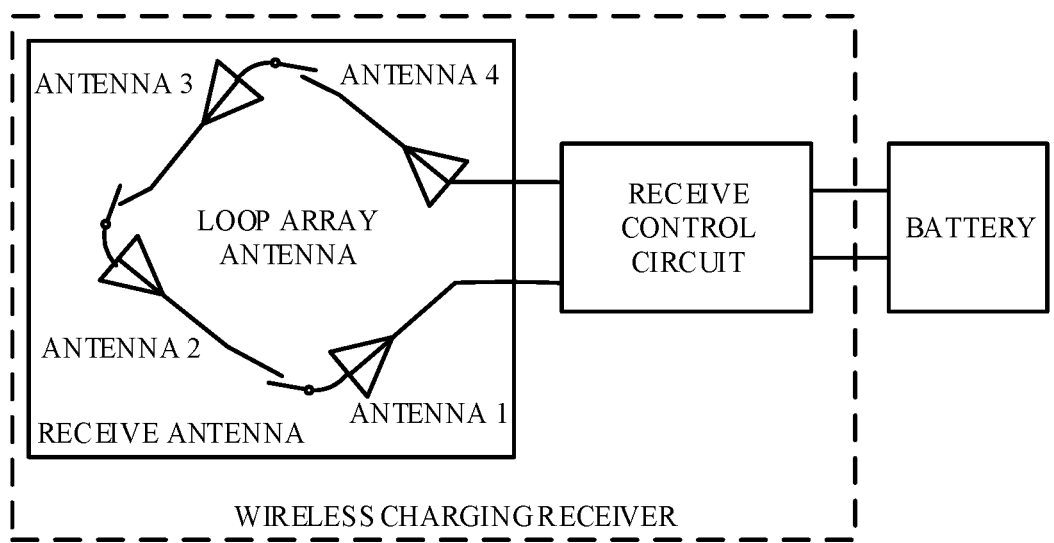
FIG. 28 is a schematic diagram illustrating a wireless charging receiver for multiplexing an antenna of a wireless communication device according to an implementation of the disclosure.

In addition, as illustrated in FIG. 28, the four antennas in the antenna system described in the implementations of the disclosure can also be multiplexed by a wireless charging receiver of the electronic device. The wireless charging receiver includes a receive antenna and a receive control circuit. The receive antenna matches transmit antennas of a wireless charging transmitter (resonates at the same or similar frequency and transfers energy in a wireless manner in the way of radiative resonant magnetic coupling). The receive control circuit converts, through a loop array antenna, the energy into a direct current (DC) to output to charge a battery. The receive control circuit can dynamically adjust a frequency of the loop array antenna and match the frequency of the loop array antenna with frequencies of the transmit antennas of the wireless charging transmitter to achieve paired charging. Alternatively, the receive control circuit interacts with the wireless charging transmitter in real time on a frequency change range to implement an "exclusive encryption" wireless charging mode.

The receive antenna may be an antenna include at least one of the four antennas (in the case of multiple antennas, the multiple antennas are strobed via switches).

Figure 29:
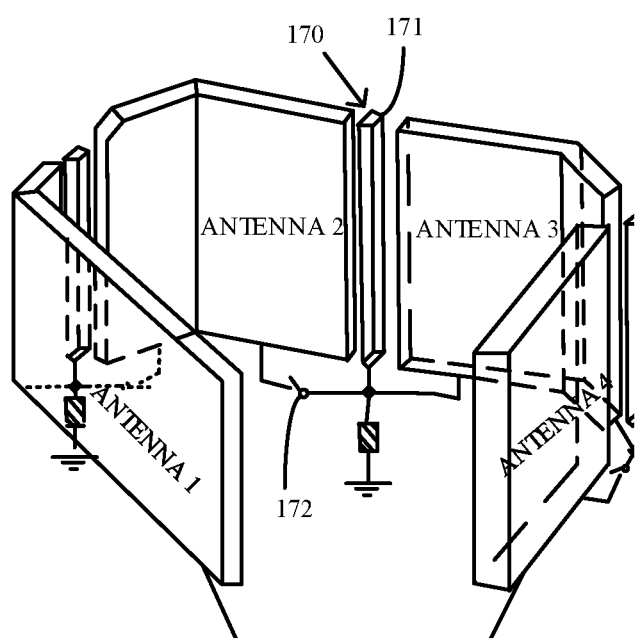
FIG. 29 is a schematic structural diagram illustrating a loop array antenna including four antennas according to an implementation of the disclosure.

For example, as illustrated in FIG. 29, the receive antenna is a loop array antenna including the four antennas described above. The four antennas include antenna 1, antenna 2, antenna 3, and antenna 4. Antenna 1 and antenna 4 are operable at both an LTE frequency band and a 5G NR frequency band, while antenna 2 and antenna 3 are only operable at the 5G NR frequency band. A port of antenna 1 and a port of antenna 4 are used as ports of the loop array antenna. Adjacent antennas are coupled via a gate circuit 170 with an isolation function. The gate circuit 170 includes a spacer 171 and a switch 172, where the spacer 171 is a conductor and the switch 172 is further coupled with a controller. The electronic device can conduct the switch 172 of each gate circuit 170 in a wireless charging mode to form a loop array antenna to receive energy. By adding the spacers 171 among the antennas, the gate circuit 170 can reduce mutual coupling among the multiple antennas of the electronic device in a normal communication mode, improve isolation among the multiple antennas, and optimize performance of the antennas. On the other hand, the multiple antennas can be coupled in series to form the loop array antenna through the switches 171, so as to better match the transmit antennas to transfer energy. Furthermore, since antenna 1 and antenna 4 have capabilities stronger than that of antenna 2 and antenna 3, the loop array antenna thus arranged can reduce energy loss in transmission as much as possible.

While the disclosure has been described in connection with certain implementations, it is to be pointed out that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A multiway switch, comprising:
n T ports and four P ports, at least one of the n T ports being coupled with all of the four P ports, and n being an integer and 4≤n; and
the multiway switch being configured to be coupled with a radio frequency circuit and an antenna system of an electronic device to implement a preset function of the electronic device, the antenna system comprising four antennas corresponding to the four P ports, and the preset function being a function of transmitting a sounding reference signal (SRS) through the four antennas in turn, wherein
each of the four P ports is coupled with a corresponding antenna of the four antennas;
the n T ports comprise first T ports and second T ports, and 4≤n≤12;
the first T ports are m T ports that at least support a transmission function, and 0<m≤11;
the second T ports are T ports other than the first T ports and only support a reception function;
each of the first T ports is coupled with the four P ports; and
each of the second T ports is coupled with one of the four P ports and any two second T ports at the same frequency band are coupled with different P ports.

2. The multiway switch of claim 1, wherein the electronic device is operable in at least one mode of: a single-frequency single-transmit mode and a dual-frequency single-transmit mode, and n and m are configured as one of the following:
n=4 and m=1; and
n=5 and m=1.

3. The multiway switch of claim 1, wherein the electronic device is operable in at least one mode of: a single-frequency single-transmit mode, a single-frequency dual-transmit mode, a dual-frequency single-transmit mode, and a dual-frequency dual-transmit mode, and n and m are configured as one of the following:
n=4 and m=2 or 3; and
n=5, m is an integer and 2≤m≤4.

4. The multiway switch of claim 1, wherein the electronic device is operable in a dual-frequency single-transmit mode, and n and m are configured as one of the following:
n=6 and m=1;
n=7 and m=1;
n=8 and m=1; and
n=9 and m=1.

5. The multiway switch of claim 1, wherein n=6 and 2≤m≤5, and the electronic device is operable in at least one mode of: a single-frequency dual-transmit mode, a dual-frequency single-transmit mode, and a dual-frequency dual-transmit mode.

6. The multiway switch of claim 1, wherein the electronic device is operable in at least one mode of: a dual-frequency single-transmit mode and a dual-frequency dual-transmit mode, and n and m are configured as one of the following:
n=7, m is an integer and 2≤m≤6;
n=8, m is an integer and 2≤m≤7;
n=9, m is an integer and 2≤m≤8; and
n=10, m is an integer and 2≤m≤9.

7. The multiway switch of claim 1, wherein the electronic device is operable in a dual-frequency dual-transmit mode, and n and m are configured as one of:
n=11, m is an integer and 3≤m≤10; and
n=12, m is an integer and 4≤m≤11.

8. The multiway switch of claim 1, wherein:
the electronic device is operable in a single-frequency single-transmit mode and the radio frequency circuit logically comprises one transmitter circuit and four receiver circuits;
the radio frequency circuit physically comprises at least one independent circuit module;
the at least one independent circuit module has at least one of a transmit-receive port and a transmit port which are configured to be coupled with the first T ports; and
the at least one independent circuit module has receive ports configured to be coupled with the second T ports or the first T ports.

9. The multiway switch of claim 1, wherein:
the electronic device is operable in a single-frequency dual-transmit mode and the radio frequency circuit logically comprises two transmitter circuits and four receiver circuits;
the radio frequency circuit physically comprises at least two independent circuit modules;
the at least two independent circuit modules have at least one of a transmit-receive port and a transmit port which are configured to be coupled with the first T ports; and
the at least two independent circuit modules have receive ports configured to be coupled with the second T ports or the first T ports.

10. The multiway switch of claim 1, wherein:
the electronic device is operable in a dual-frequency single-transmit mode and the radio frequency circuit logically comprises two transmitter circuits and eight receiver circuits;
the radio frequency circuit physically comprises at least one independent circuit module;
the at least one independent circuit module has at least one of a transmit-receive port and a transmit port which are configured to be coupled with the first T ports; and
the at least one independent circuit module has receive ports configured to be coupled with the second T ports or the first T ports.

11. The multiway switch of claim 1, wherein:
the electronic device operable is in a dual-frequency dual-transmit mode and the radio frequency circuit logically comprises four transmitter circuits and eight receiver circuits;
the radio frequency circuit physically comprises at least two independent circuit modules;
the at least two independent circuit modules have at least one of a transmit-receive port and a transmit port which are configured to be coupled with the first T ports; and
the at least two independent circuit modules have receive ports configured to be coupled with the second T ports or the first T ports.

12. The multiway switch of claim 11, wherein:
at least one of the two independent circuit modules includes two power amplifiers (PA), and the two PAs are operable at different frequency bands.

13. The multiway switch of claim 1, wherein:
the four antennas comprise a first antenna, a second antenna, a third antenna, and a fourth antenna;
the first antenna and the fourth antenna are antennas operable at a long term evolution (LTE) frequency band and a fifth generation new radio (5G NR) frequency band; and
the second antenna and the third antenna are antennas only operable at the 5G NR frequency band.

14. The multiway switch of claim 13, wherein the antenna system further comprises a first combiner and a second combiner, wherein:
the first combiner has a first port configured to be coupled with the first antenna, a second port configured to be coupled with a first receive path in LTE 4×4 multiple-input multiple-output (MIMO) configuration of the electronic device, and a third port configured to be coupled with a corresponding P port of the multiway switch; and
the second combiner has a first port configured to be coupled with the fourth antenna, a second port configured to be coupled with a second receive path in the LTE 4×4 MIMO configuration of the electronic device, and a third port configured to be coupled with a corresponding P port of the multiway switch.

15. The multiway switch of claim 13, wherein the antenna system further comprises a first single-pole double-throw (SPDT) switch and a second SPDT switch, wherein
the first SPDT switch has a first port configured to be coupled with the first antenna, a second port configured to be coupled with a first receive path in LTE 4×4 MIMO configuration of the electronic device, and a third port configured to be coupled with a corresponding P port of the multiway switch; and
the second SPDT switch has a first port configured to be coupled with the fourth antenna, a second port configured to be coupled with a second receive path in the LTE 4×4 MIMO configuration of the electronic device, and a third port configured to be coupled with a corresponding P port of the multiway switch.

16. A radio frequency system, comprising:
an antenna system, a radio frequency circuit, and a multiway switch coupled with the radio frequency circuit and the antenna system;
the multiway switch comprising n T ports and four P ports, at least one of the n T ports being coupled with all of the four P ports, and n being an integer and 4≤n;
the antenna system comprising four antennas corresponding to the four P ports; and
the multiway switch being configured to implement a preset function of transmitting an SRS through the four antennas in turn wherein
each of the four P ports is coupled with a corresponding antenna of the four antennas;
the n T ports comprises m first T ports and (n−m) second T ports, the first T ports at least support a transmission function and the second T ports support only a reception function, 0<m≤11, and 4≤n≤12;
each first T port is coupled with all of the four P ports; and
each second T port is coupled with one of the four P ports and any two second T ports at the same frequency band are coupled with different P ports.

17. A wireless communication device, comprising:
an antenna system, a radio frequency transceiver, a radio frequency circuit coupled with the radio frequency transceiver, and a multiway switch coupled with the radio frequency circuit and the antenna system;
the multiway switch comprising n T ports and four P ports, at least one of the n T ports being coupled with all of the four P ports, and n being an integer and 4≤n;

the antenna system comprising four antennas corresponding to the four P ports; and the multiway switch being configured to support a function of transmitting an SRS through the four antennas in turn, wherein each of the four P ports is coupled with a corresponding antenna of the four antennas;

the n T ports comprises m first T ports and (n−m) second T ports, the first T ports at least support a transmission function and the second T ports support only a reception function, $0<m\leq 11$, and $4\leq n\leq 12$;

each first T port is coupled with all of the four P ports; and each second T port is coupled with one of the four P ports and any two second T ports at the same frequency band are coupled with different P ports.

* * * * *